(12) United States Patent
Rezayee et al.

(10) Patent No.: US 12,020,235 B2
(45) Date of Patent: Jun. 25, 2024

(54) MULTI-SOURCE TRANSACTION PROCESSING

(71) Applicant: Block, Inc., San Francisco, CA (US)

(72) Inventors: Afshin Rezayee, Richmond Hill (CA); Malcolm Smith, Toronto (CA); Lev Kusman, Concord (CA); Gokhan Aydeniz, Mississauga (CA); Yasser Zabuair, Toronto (CA); Jesse Wilson, Waterloo (CA); Shawn Zurbrigg, Waterloo (CA); Murat Cat, Thornhill (CA)

(73) Assignee: Block, Inc., Oakland, CA (US)

( * ) Notice: Subject to any disclaimer, the term of this patent is extended or adjusted under 35 U.S.C. 154(b) by 27 days.

(21) Appl. No.: 15/581,972

(22) Filed: Apr. 28, 2017

(65) Prior Publication Data

US 2018/0315038 A1  Nov. 1, 2018

(51) Int. Cl.
| | |
|---|---|
| *G06Q 20/32* | (2012.01) |
| *G06Q 20/20* | (2012.01) |
| *G06Q 20/22* | (2012.01) |
| *G06Q 20/40* | (2012.01) |
| *H04W 76/10* | (2018.01) |

(52) U.S. Cl.
CPC ......... *G06Q 20/3278* (2013.01); *G06Q 20/20* (2013.01); *G06Q 20/227* (2013.01); *G06Q 20/4014* (2013.01); *H04W 76/10* (2018.02)

(58) Field of Classification Search
CPC ........... G06Q 20/3278; G06Q 20/4014; G06Q 20/341; H04W 76/06
See application file for complete search history.

(56) References Cited

U.S. PATENT DOCUMENTS

| | | |
|---|---|---|
| 3,863,050 A | 1/1975 | Brugger et al. |
| 4,048,476 A | 9/1977 | Lawter et al. |
| (Continued) | | |

FOREIGN PATENT DOCUMENTS

| | | |
|---|---|---|
| EP | 2 579 194 A1 | 4/2013 |
| WO | 2013/147904 A1 | 10/2013 |
| (Continued) | | |

OTHER PUBLICATIONS

Christopher Brown "Netcom unveils NFC microSD add-on", Jun. 6, 2011. Downloaded from https://www.nfcw.com/2011/06/06/37813/netcom-nfc-microsd-add-on/. (Year: 2011).*

(Continued)

*Primary Examiner* — Daniel S Felten
*Assistant Examiner* — Claire A Rutiser
(74) *Attorney, Agent, or Firm* — Maynard Nexsen PC; Brian T. Sattizahn, Esq.

(57) ABSTRACT

A device may run an application having information with multiple accounts associated with processing of transactions. The application may provide account information that is used to process the transactions. At the same time, a background application may operate on the device. The background application may be compatible with a second device, and when within range of the second device, may communicate background messages relevant to the transaction. The transaction may then be processed based on the account information and the background messages.

29 Claims, 8 Drawing Sheets

(56) References Cited

U.S. PATENT DOCUMENTS

| | | | |
|---|---|---|---|
| 5,859,414 A | 1/1999 | Grimes et al. | |
| 6,311,165 B1 | 10/2001 | Coutts et al. | |
| 6,330,546 B1 | 12/2001 | Gopinathan et al. | |
| 7,343,561 B1* | 3/2008 | Stochosky | G06Q 10/10 |
| | | | 715/758 |
| 7,376,618 B1 | 5/2008 | Anderson et al. | |
| 7,702,553 B1 | 4/2010 | Dickelman | |
| 7,783,515 B1 | 8/2010 | Kumar et al. | |
| 7,788,195 B1 | 8/2010 | Subramanian et al. | |
| 8,397,988 B1 | 3/2013 | Zuili | |
| 8,498,900 B1* | 7/2013 | Spirin | G06Q 50/00 |
| | | | 340/286.09 |
| 8,560,002 B1* | 10/2013 | Narendran | H04W 52/221 |
| | | | 455/522 |
| 8,606,696 B1 | 12/2013 | Halpern | |
| 8,745,698 B1 | 6/2014 | Ashfield et al. | |
| 8,762,272 B1 | 6/2014 | Cozens et al. | |
| 8,856,894 B1 | 10/2014 | Dean et al. | |
| 8,990,121 B1 | 3/2015 | Guise et al. | |
| 9,082,267 B2* | 7/2015 | Rosenberg | G06Q 30/0601 |
| 9,125,180 B1* | 9/2015 | Hamilton | H04W 76/10 |
| 9,165,296 B2 | 10/2015 | Gannon | |
| 9,166,999 B1 | 10/2015 | Kulkarni et al. | |
| 9,286,500 B1 | 3/2016 | Post et al. | |
| 9,373,112 B1 | 6/2016 | Henderson et al. | |
| 9,396,730 B2 | 7/2016 | Karpey et al. | |
| 9,436,335 B1* | 9/2016 | Scherer | G06F 3/0412 |
| 9,530,128 B1 | 12/2016 | Bekmann et al. | |
| 9,633,322 B1 | 4/2017 | Burger | |
| 9,767,471 B1 | 9/2017 | Perrone et al. | |
| 9,818,093 B1 | 11/2017 | Grier | |
| 9,836,732 B1 | 12/2017 | Mocko et al. | |
| 9,852,410 B1 | 12/2017 | Chen et al. | |
| 9,996,829 B1 | 6/2018 | Baig et al. | |
| 10,026,076 B2 | 7/2018 | Kumar et al. | |
| 10,049,349 B1* | 8/2018 | Grassadonia | G06Q 20/10 |
| 10,062,078 B1 | 8/2018 | Boates et al. | |
| 10,068,235 B1 | 9/2018 | Boates et al. | |
| 10,163,107 B1 | 12/2018 | White et al. | |
| 10,185,958 B2 | 1/2019 | Henderson et al. | |
| 10,339,525 B2* | 7/2019 | Bogaard | G06Q 20/4014 |
| 10,366,378 B1* | 7/2019 | Han | G06Q 20/4014 |
| 10,417,635 B1 | 9/2019 | Aaron | |
| 10,460,317 B2* | 10/2019 | Chitilian | G06Q 20/38215 |
| 10,515,354 B1 | 12/2019 | Ishaq | |
| 2002/0099649 A1 | 7/2002 | Lee et al. | |
| 2002/0133409 A1 | 9/2002 | Sawano et al. | |
| 2004/0034612 A1 | 2/2004 | Mathewson et al. | |
| 2004/0098350 A1 | 5/2004 | Labrou et al. | |
| 2004/0148252 A1 | 7/2004 | Fleishman | |
| 2005/0021400 A1* | 1/2005 | Postrel | G06Q 30/0227 |
| | | | 705/14.27 |
| 2005/0071232 A1 | 3/2005 | Frater | |
| 2005/0109841 A1 | 5/2005 | Ryan et al. | |
| 2006/0000900 A1 | 1/2006 | Fernandes et al. | |
| 2006/0129500 A1 | 6/2006 | Mandy et al. | |
| 2006/0151598 A1 | 7/2006 | Chen et al. | |
| 2006/0224507 A1 | 10/2006 | Torpin et al. | |
| 2006/0240890 A1 | 10/2006 | Walker et al. | |
| 2006/0249574 A1 | 11/2006 | Brown et al. | |
| 2006/0255128 A1 | 11/2006 | Johnson et al. | |
| 2007/0001853 A1* | 1/2007 | Otranen | G06K 7/10237 |
| | | | 340/572.1 |
| 2007/0106609 A1 | 5/2007 | Phillips et al. | |
| 2007/0108279 A1 | 5/2007 | Wang | |
| 2007/0226095 A1 | 9/2007 | Petriuc | |
| 2007/0245158 A1* | 10/2007 | Giobbi | H04L 63/0861 |
| | | | 713/186 |
| 2008/0005037 A1 | 1/2008 | Hammad et al. | |
| 2008/0103968 A1* | 5/2008 | Bies | G06Q 20/06 |
| | | | 705/39 |
| 2008/0201230 A1* | 8/2008 | Hardison | G06Q 30/0234 |
| | | | 705/14.34 |
| 2008/0208743 A1 | 8/2008 | Arthur et al. | |
| 2008/0238610 A1* | 10/2008 | Rosenberg | G06Q 20/223 |
| | | | 705/26.1 |
| 2008/0319869 A1 | 12/2008 | Carlson et al. | |
| 2009/0006151 A1 | 1/2009 | Zarghami et al. | |
| 2009/0048936 A1 | 2/2009 | Lerch et al. | |
| 2009/0055276 A1 | 2/2009 | Dunsmore et al. | |
| 2009/0164374 A1 | 6/2009 | Shastry | |
| 2009/0289936 A1 | 11/2009 | Sheedy et al. | |
| 2010/0005013 A1 | 1/2010 | Uriarte | |
| 2010/0023204 A1 | 1/2010 | Basir et al. | |
| 2010/0057612 A1 | 3/2010 | Wagenhals | |
| 2010/0063945 A1 | 3/2010 | Cowan, Jr. | |
| 2010/0106570 A1* | 4/2010 | Radu | G06Q 30/0229 |
| | | | 705/14.3 |
| 2010/0114776 A1 | 5/2010 | Weller et al. | |
| 2010/0299195 A1 | 11/2010 | Nix et al. | |
| 2010/0305993 A1 | 12/2010 | Fisher | |
| 2011/0047075 A1 | 2/2011 | Fourez | |
| 2011/0082737 A1* | 4/2011 | Crowe | G06Q 30/02 |
| | | | 705/14.27 |
| 2011/0131122 A1 | 6/2011 | Griffin et al. | |
| 2011/0131130 A1 | 6/2011 | Griffin et al. | |
| 2011/0254655 A1 | 10/2011 | Maalouf et al. | |
| 2011/0313871 A1 | 12/2011 | Greenwood | |
| 2012/0054102 A1 | 3/2012 | Schwartz et al. | |
| 2012/0072349 A1 | 3/2012 | Bernstein et al. | |
| 2012/0123935 A1 | 5/2012 | Brudnicki et al. | |
| 2012/0150728 A1* | 6/2012 | Isaacson | G06Q 30/0226 |
| | | | 705/39 |
| 2012/0173410 A1 | 7/2012 | Gillin | |
| 2012/0310744 A1 | 12/2012 | Kim et al. | |
| 2012/0317013 A1 | 12/2012 | Luk et al. | |
| 2013/0013352 A1* | 1/2013 | Fisher | G06Q 20/20 |
| | | | 705/5 |
| 2013/0046643 A1* | 2/2013 | Wall | G06Q 20/3278 |
| | | | 705/16 |
| 2013/0073347 A1 | 3/2013 | Bogaard et al. | |
| 2013/0080331 A1 | 3/2013 | Granbery et al. | |
| 2013/0103482 A1 | 4/2013 | Song et al. | |
| 2013/0132274 A1* | 5/2013 | Henderson | G06Q 20/4014 |
| | | | 705/41 |
| 2013/0132854 A1 | 5/2013 | Raleigh et al. | |
| 2013/0198076 A1 | 8/2013 | Zambelli Hosmer et al. | |
| 2013/0218721 A1* | 8/2013 | Borhan | G06Q 20/322 |
| | | | 705/26.41 |
| 2013/0218757 A1 | 8/2013 | Ramanathan et al. | |
| 2013/0226318 A1 | 8/2013 | Procyk et al. | |
| 2013/0254115 A1* | 9/2013 | Pasa | G06Q 20/20 |
| | | | 705/67 |
| 2013/0282589 A1* | 10/2013 | Shoup | G06F 21/34 |
| | | | 705/67 |
| 2013/0297512 A1 | 11/2013 | Phillips et al. | |
| 2013/0332293 A1* | 12/2013 | Ran | G06Q 20/204 |
| | | | 705/17 |
| 2013/0346222 A1 | 12/2013 | Ran | |
| 2014/0114857 A1 | 4/2014 | Griggs et al. | |
| 2014/0172551 A1 | 6/2014 | Desai et al. | |
| 2014/0188733 A1 | 7/2014 | Granbery | |
| 2014/0195272 A1 | 7/2014 | Sadiq et al. | |
| 2014/0207683 A1 | 7/2014 | Bailey et al. | |
| 2014/0244409 A1* | 8/2014 | Nathanel | G06Q 30/02 |
| | | | 705/15 |
| 2014/0249948 A1 | 9/2014 | Graylin et al. | |
| 2014/0258055 A1 | 9/2014 | Wolfe et al. | |
| 2014/0279113 A1 | 9/2014 | Balasubramanian | |
| 2014/0310113 A1 | 10/2014 | Sengupta et al. | |
| 2014/0312118 A1 | 10/2014 | Marcus et al. | |
| 2014/0344151 A1* | 11/2014 | Soundararajan | G06Q 20/322 |
| | | | 705/44 |
| 2014/0364148 A1* | 12/2014 | Block | H04M 1/72597 |
| | | | 455/456.3 |
| 2014/0374489 A1 | 12/2014 | Cox | |
| 2014/0375428 A1* | 12/2014 | Park | G06K 7/10237 |
| | | | 340/10.1 |
| 2015/0025956 A1 | 1/2015 | Beyer | |
| 2015/0041534 A1 | 2/2015 | Rayner et al. | |
| 2015/0046557 A1* | 2/2015 | Rosenberg | H04L 67/2842 |
| | | | 709/213 |

(56) References Cited

U.S. PATENT DOCUMENTS

| | | | |
|---|---|---|---|
| 2015/0074366 A1 | 3/2015 | Calciu et al. | |
| 2015/0081462 A1 | 3/2015 | Ozvat et al. | |
| 2015/0081557 A1 | 3/2015 | Kinfoil et al. | |
| 2015/0097030 A1* | 4/2015 | Gallo | G06K 19/0723 235/492 |
| 2015/0106216 A1 | 4/2015 | Kenderov | |
| 2015/0106260 A1 | 4/2015 | Andrews et al. | |
| 2015/0112822 A1 | 4/2015 | Aaron et al. | |
| 2015/0120560 A1 | 4/2015 | Fisher et al. | |
| 2015/0186871 A1 | 7/2015 | Laracey | |
| 2015/0220925 A1 | 8/2015 | Brickell et al. | |
| 2015/0242662 A1 | 8/2015 | Claessen | |
| 2015/0277967 A1 | 10/2015 | Calciu et al. | |
| 2015/0332223 A1* | 11/2015 | Aaron | G06Q 20/42 705/39 |
| 2015/0339648 A1* | 11/2015 | Kushevsky | G06Q 20/32 705/21 |
| 2015/0379506 A1 | 12/2015 | Griffin | |
| 2016/0034887 A1 | 2/2016 | Lee | |
| 2016/0050203 A1* | 2/2016 | Hefetz | H04L 63/18 726/7 |
| 2016/0055538 A1 | 2/2016 | Todasco | |
| 2016/0063480 A1 | 3/2016 | Ballesteros et al. | |
| 2016/0071115 A1 | 3/2016 | Oh et al. | |
| 2016/0117670 A1 | 4/2016 | Davis | |
| 2016/0142174 A1* | 5/2016 | Fine | H04K 3/86 455/1 |
| 2016/0162882 A1 | 6/2016 | McClung, III | |
| 2016/0227359 A1* | 8/2016 | Hurewitz | G06Q 30/02 |
| 2016/0253651 A1* | 9/2016 | Park | G06Q 20/321 705/39 |
| 2017/0004475 A1* | 1/2017 | White | G06Q 20/204 |
| 2017/0018001 A1 | 1/2017 | Tunnell et al. | |
| 2017/0076291 A1* | 3/2017 | Cairns | G06Q 20/02 |
| 2017/0091765 A1* | 3/2017 | Lloyd | G06Q 20/32 |
| 2017/0178133 A1 | 6/2017 | Griffin | |
| 2017/0200144 A1* | 7/2017 | Chatterton | G06Q 20/3224 |
| 2017/0262827 A1 | 9/2017 | Lee | |
| 2017/0293907 A1* | 10/2017 | Salmon | G06Q 20/206 |
| 2017/0293911 A1* | 10/2017 | Vyas | G06K 7/0004 |
| 2017/0310653 A1* | 10/2017 | Zhang | H04L 63/08 |
| 2018/0018704 A1* | 1/2018 | Tunnell | G06Q 30/0269 |
| 2018/0204195 A1 | 7/2018 | Kang | |
| 2018/0268408 A1 | 9/2018 | Botros et al. | |
| 2019/0021133 A1* | 1/2019 | Vandenheste | H04W 76/14 |
| 2019/0287108 A1 | 9/2019 | White et al. | |
| 2019/0347661 A1* | 11/2019 | Grenader | G06Q 20/341 |
| 2020/0034822 A1 | 1/2020 | Rezayee et al. | |

FOREIGN PATENT DOCUMENTS

| | | |
|---|---|---|
| WO | 2014/174261 A1 | 10/2014 |
| WO | 2018/125444 A1 | 7/2018 |
| WO | 2018/175462 A1 | 9/2018 |
| WO | 2018/200962 A1 | 11/2018 |

OTHER PUBLICATIONS

Unknown, "Beacon Paypal", Retrieved from the internet - url: http://www.paypal.com/webapps/mpp/beacon, Jul. 17, 2014, 1-6 (Year: 2014).*

"Background processing" downloaded Dec. 16, 2022 from https://www.pcmag.com/encyclopedia/term/background-processing (Year: 2022).*

Rao, Leena, "Paypal Debuts its Newest Hardward, Beacon, A Bluetooth LE Enabled Device for Hands-Free Check Ins and Payments", http://techcrunch.com/2013/09/09palpal-debuts-its-newest-hardware-beacon-a-bluetooth-le-enabled-device-for-hands-free-check-ins-and-payments, Sep. 9, 2013 (Year: 2013).*

Non-Final Office Action dated Jan. 22, 2019, for U.S. Appl. No. 14/562,285, of Ishaq, N., filed Dec. 12, 2014.

Advisory Action mailed Jun. 25, 2018, for U.S. Appl. No. 15/476,657, of Yip, T., et al., filed Mar. 31, 2017.

Notice of Allowance mailed Aug. 15, 2018, for U.S. Appl. No. 15/087,698, of White, M.W., et al., filed Mar. 31, 2016.

International Search Report and Written Opinion for International Application No. PCT/US2018/029807, mailed Jul. 26, 2018.

"Clemson University Parking Services Parking Citations," Clemson University, dated Dec. 5, 2010, pp. 1-2.

"EMV Integrated Circuit Card Specifications for Payment Systems; Book 3: Application Specification," dated Jun. 2008, Version 4.2, Section—10.5, pp. 1-238.

Novak, E.J., "Security and Privacy for Ubiquitous Mobile Devices," The College of William and Mary, dated 2016, Retrieved from the Internet URL: https://search.proquest.com/docview/1831587875/ED0257082428464BPQ/8?accountid=14753, on Jan. 17, 2018, pp. 1-2.

Non-Final Office Action mailed Dec. 11, 2014, for U.S. Appl. No. 14/323,747, of Wagner, D.R., filed Jul. 3, 2014.

Non-Final Office Action mailed Mar. 12, 2015, for U.S. Appl. No. 14/455,577, of Bekmann, J., et al., filed Aug. 8, 2014.

Final Office Action mailed Apr. 23, 2015, for U.S. Appl. No. 14/323,747, of Wagner, D.R., filed Jul. 3, 2014.

Final Office Action mailed Sep. 24, 2015, for U.S. Appl. No. 14/455,577, of Bekmann, J., et al., filed Aug. 8, 2014.

Non-Final Office Action mailed Oct. 21, 2015, for U.S. Appl. No. 14/323,747, of Wagner, D.R., filed Jul. 3, 2014.

Non-Final Office Action mailed Oct. 23, 2015, for U.S. Appl. No. 14/307,334, of Chen, G.H., et al., iled Jun. 17, 2014.

Advisory Action mailed Jan. 5, 2016, for U.S. Appl. No. 14/455,577, of Bekmann, J., et al., filed Aug. 8, 2014.

Final Office Action mailed Mar. 23, 2016, for U.S. Appl. No. 14/323,747, of Wagner, D.R., filed Jul. 3, 2014.

Non-Final Office Action mailed Apr. 22, 2016, for U.S. Appl. No. 14/455,577, of Bekmann, J., et al., filed Aug. 8, 2014.

Final Office Action mailed May 20, 2016, for U.S. Appl. No. 14/307,334, of Chen, G.H., et al., filed Jun. 17, 2014.

Notice of Allowance mailed Aug. 18, 2016, for U.S. Appl. No. 14/455,577, of Bekmann, J., et al., filed Aug. 8, 2014.

Advisory Action mailed Aug. 25, 2016, for U.S. Appl. No. 14/307,334, of Chen, G.H., et al., filed Jun. 17, 2014.

Non-Final Office Action mailed Feb. 27, 2017, for U.S. Appl. No. 14/307,334, of Chen, G.H., et al., filed Jun. 17, 2014.

Non-Final Office Action mailed Mar. 2, 2017, for U.S. Appl. No. 15/390,918, of Baig, R., et al., filed Dec. 27, 2016.

Non-Final Office Action mailed Mar. 17, 2017, for U.S. Appl. No. 14/553,704, of Mocko, C.L., et al., filed Nov. 25, 2014.

Notice of Allowance mailed Aug. 3, 2017, for U.S. Appl. No. 14/553,704, of Mocko, C.L., et al., filed Nov. 25, 2014.

Non-Final Office Action mailed Aug. 28, 2017, for U.S. Appl. No. 14/562,285, of Ishaq, N., filed Dec. 5, 2014.

Notice of Allowance mailed Aug. 30, 2017, for U.S. Appl. No. 14/307,334, of Chen, G.H., et al., filed Jun. 17, 2014.

Final Office Action mailed Sep. 11, 2017, for U.S. Appl. No. 15/390,918, of Baig, R., et al., filed Dec. 27, 2016.

Non-Final Office Action mailed Oct. 6, 2017, for U.S. Appl. No. 15/476,657, of Yip, T., et al., filed Mar. 31, 2017.

Advisory Action mailed Dec. 27, 2017, for U.S. Appl. No. 15/390,918, of Baig, R., et al., filed Dec. 27, 2016.

Final Office Action mailed Dec. 29, 2017, for U.S. Appl. No. 14/562,285, of Ishaq, N., filed Dec. 5, 2014.

Notice Of Allowance mailed Jan. 26, 2018, for U.S. Appl. No. 15/390,918, of Baig, R., et al., filed Dec. 27, 2016.

Final Office Action mailed Mar. 28, 2018, for U.S. Appl. No. 15/476,657, of Yip, T., et al., filed Mar. 31, 2017.

Advisory Action mailed Mar. 30, 2018, for U.S. Appl. No. 14/562,285, of Ishaq, N., filed Dec. 5, 2014.

International Search Report and Written Opinion for International Application No. PCT/US2017/063054, mailed Feb. 13, 2018.

International Search Report and Written Opinion for International Application No. PCT/US2018/023392, mailed Jun. 11, 2018.

Bhatla T.P., et al., "Understanding Credit Card Frauds," Jun. 2003, Tata Consultancy Services, 17 pages.

Notice of Allowance mailed Aug. 13, 2019, for U.S. Appl. No. 14/562,285, of Ishaq, N., filed Dec. 5, 2014.

(56) References Cited

OTHER PUBLICATIONS

Non-Final Office action mailed Sep. 27, 2019, for U.S. Appl. No. 15/464,079, of Botros, P.A., et al., filed Mar. 20, 2017.
Final Office Action mailed Oct. 8, 2019, for U.S. Appl. No. 15/489,700, of Lee, R., filed Apr. 17, 2017.
Final Office Action mailed Nov. 4, 2019, for U.S. Appl. No. 15/476,657, of Yip, T., et al., filed Mar. 31, 2017.
Non-Final Office Action mailed Nov. 18, 2019, for U.S. Appl. No. 15/476,705, of Yip, T., et al., filed Mar. 31, 2017.
Non-Final Office Action mailed May 6, 2019, for U.S. Appl. No. 15/489,700, of Lee, R., filed Apr. 17, 2017.
Final Office Action mailed May 13, 2019, for U.S. Appl. No. 14/562,285, of Ishaq, N., filed Dec. 5, 2014.
Non-Final Office Action mailed Jun. 6, 2019, for U.S. Appl. No. 15/476,657, of Yip, T., et al., filed Mar. 31, 2017.
Final Office Action mailed Jun. 8, 2020, for U.S. Appl. No. 15/476,705, of Yip, T., et al., filed Mar. 31, 2017.
Final Office Action mailed Jun. 16, 2020, for U.S. Appl. No. 15/489,700, of Lee, R., filed Apr. 17, 2017.
Notice of Allowance mailed Apr. 13, 2020, for U.S. Appl. No. 15/476,657, of Yip, T., et al., filed Mar. 31, 2017.
Bank of America Corporation; Patent Issued for Dynamic Authentication Engine (Jun. 19, 2014), Computer Weekly News Retrieved from http://dialog.proquest.com/Professional/docview/1534570020?accountid=131444 on Feb. 6, 2020 (Year: 2014).
Square-Pay-by-Name, Uploaded on Youtube.com by AppJudgment, Sep. 7, 2011).
Advisory Action mailed Dec. 20, 2019, for U.S. Appl. No. 15/489,700, of Lee, R., filed Apr. 17, 2017.
Non-Final Office Action mailed Jan. 15, 2020, for U.S. Appl. No. 15/489,700, of Lee, R., filed Apr. 17, 2017.
Notice of Allowance mailed Feb. 12, 2020, for U.S. Appl. No. 15/476,657, of Yip, T., et al., filed Mar. 31, 2017.
Non-Final Office Action mailed Jul. 30, 2021, for U.S. Appl. No. 16/588,964, of Rezayee, A., et al., filed Sep. 30, 2019.
EMV Integrated Circuit Card Specifications for Payment Systems; Book 3: Application Specification, dated Jun. 2008, Version 4.2, Section—10.5, pp. 1-238 (Year: 2008).
"PIN Bypass in the U.S. Market," EMV Migration Forum White Paper, dated Feb. 2016, Version 1.1, retrieved from Internet URL: https://web.archive.org/web/20161020113903/http://www.emv-connection.com:80/downloads/2016/02/PIN-Bypass-WP-V1.1-Public-Release-FINAL-February-2016.pdf, on May 28, 2018, pp. 1-12.

\* cited by examiner

MULTI-SOURCE TRANSACTION PROCESSING

BACKGROUND

Consumers today hold many types of accounts that may be used for numerous types of transactions, including effecting a payment, associating with a loyalty account, identification of a user, and various other purposes. Such accounts may be personal to a user (e.g., an account associated with a bank or credit account, a loyalty account, identification, customer account, access card, etc.), may be generalized accounts (e.g., a gift card having an account number or other identifier that is not associated with any particular user), or may be other or combination account types. In view of the proliferation of accounts and account types, a single user may have numerous accounts that may be relevant to a particular transaction or set of transactions. The accounts may be associated with the user in various ways, such as dedicated cards, proxy cards, accounts stored on mobile devices, accounts associated with user information such as biometric information, and a variety of other account, card, and system types.

Some individuals find managing, carrying, and handling a variety of accounts, cards, devices, and applications to be inconvenient and burdensome. For example, multiple cards, payment devices, key cards, and other identifying objects may be difficult to keep track of or to fit within pockets, a wallet, a purse, or other modes of transporting said account information from location to location. Transactions may occur under rushed circumstances, or a customer may have difficulty finding a desired payment card, accessing an application, or identifying account information. Different account types may interface with different systems in different manners, which may limit the types of accounts or systems that may be utilized in a particular transaction.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
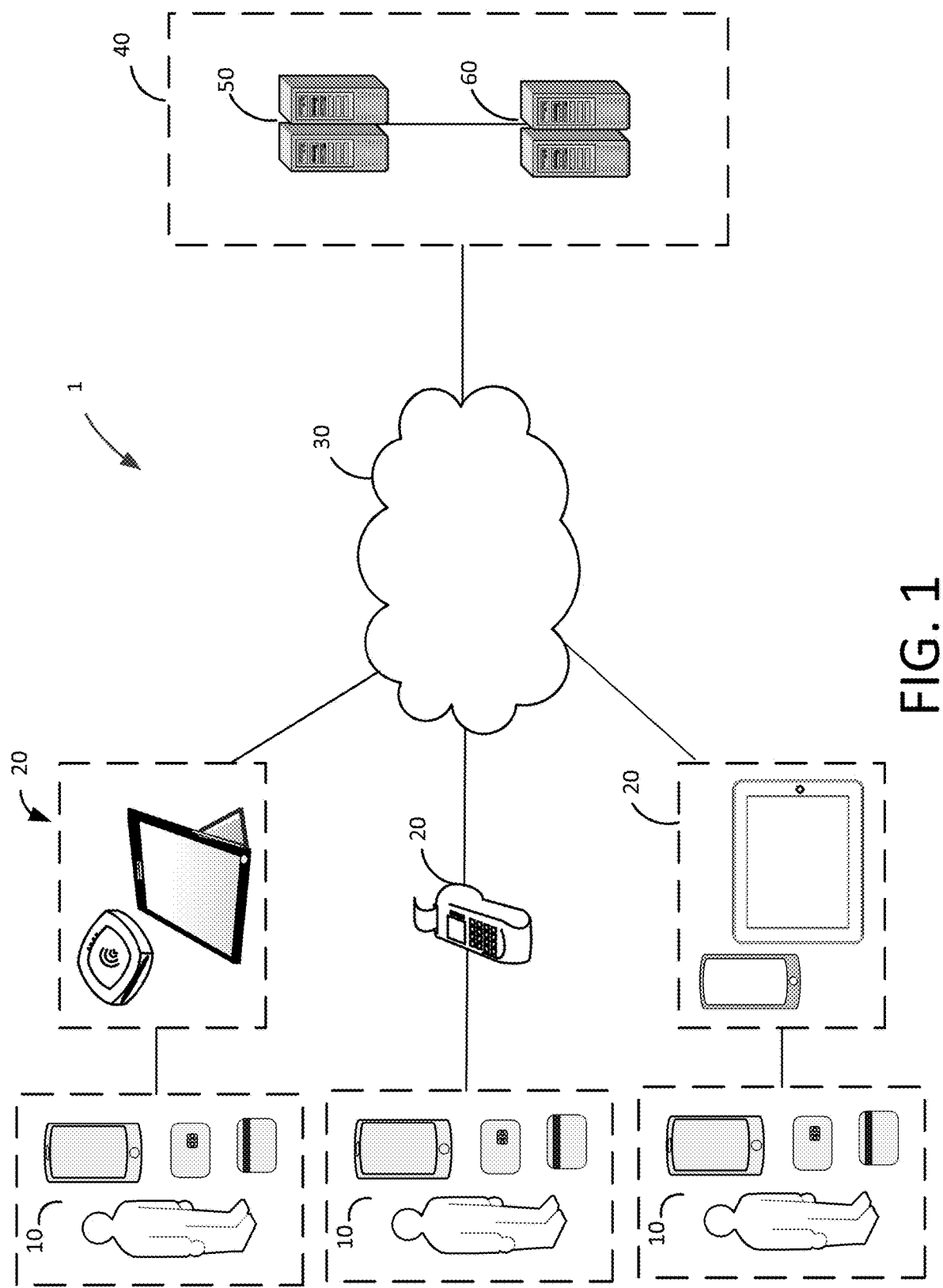
FIG. 1 shows an illustrative block diagram of a payment system in accordance with some embodiments of the present disclosure.

A payment device such as payment card or a mobile device operating a transaction application has an interface for providing information to a payment terminal such as a payment reader, and in many applications, may have multiple communication interfaces for communicating with the payment reader. Such interfaces include magnetic stripe interfaces (fixed or configurable), chip card interfaces, near field communication (NFC) interfaces, WiFi, Bluetooth, and other suitable interfaces. This information, in turn, may be used to process transactions in various manners. In a situation with multiple interfaces, or in some instances, with a single interface, information can be exchanged via multiple devices, programs, and/or interfaces within a single transaction (e.g., simultaneously, interleaved, multiplexed, etc.). In this manner, different types of information may be exchanged with different devices, interfaces, or programs to enable complex transaction handling strategies, and to accommodate different payment transaction situations (e.g., divergent payment devices of customers and merchant devices).

A payment device may be configured to run transaction applications which may be associated with user accounts. Certain transaction applications may operate according to standard protocols, for example, for a mobile device performing payment card emulation (e.g., host card emulation (HCE), etc.) or a chip card performing EMV transactions. The payment cards may be stored in software, such as in a wallet, and associated transaction applications may communicate messages according to standard protocol exchanging transaction information, such as those promulgated by EMV, ISO, or other similar standards organizations. Payment information associated with a payment card may be exchanged via messages according to standardized payment protocol, and may be exchanged wirelessly with a payment reader, such as using NFC communication.

One or more accounts may be configured to operate as a background program, and in some embodiments, according to non-standard protocols. Payment devices such as payment cards or mobile devices may operate background programs that attempt to communicate with compatible devices while located within a desired proximity of the compatible devices. The background application may perform a variety of functions, such as identifying the payment device, available accounts of the payment device, background accounts that are capable of being accessed, information about a customer or user. The background information may also receive information that is relevant to a user's current use context, such as information relevant to a merchant device (e.g., available payment interfaces, available payment programs, compatible hardware etc.), information relevant to a user's location, information relevant to likely and/or related transactions, and other similar information.

For example, a payment device such as a payment card or mobile device may be configured to communicate background messages according to a protocol that falls outside of a standard payment protocol (e.g., EMV, HCE, etc.) or via one or more additional interfaces. By receiving information prior to execution of a transaction based on the background information, other information such as payment cards, loyalty cards, and other information may be pre-loaded. In some embodiments, the background information can communicate in parallel with the standard transaction application, such that transactions may be completed without use of the standard transaction application, information relevant to the transaction (e.g., coupons, typical purchased items, user selections of cards and programs, offers for items, offers for payment card incentives, etc.) may be pre-loaded for a transaction, or a transaction may be handled normally via a standard payment protocol in parallel with exchange of information via the background communications channel. In some embodiments, information to prepare or optimize payment methods and communication channels may be provided via the background channel, for example, to promote payment or loyalty usage based on certain cards, begin communications with payment systems prior to initiating the standard payment processes, and exchange relevant transaction information with payment servers and service systems.

In an embodiment, merchant devices types such as payment readers may operate a background transaction processing program that facilitates communications with payment devices. The merchant device background program may be a custom device program or may be an application operating a communication device such as a mobile device operating a transaction processing program. The merchant device background program monitors for compatible payment devices and exchanges information for facilitating the processing of transactions, as described herein.

In some embodiments, a compatible merchant device can send messages to a payment device indicating that the payment reader is compatible with a background communication such as non-standard protocol communication and can communicate with the payment device (e.g., a compatible transaction application on the device) via messages according to the non-standard protocol. The merchant device may periodically attempt to transmit a message via the merchant device's communication interfaces (e.g., wireless interface) indicative of its background protocol compatibility. A compatible payment device (e.g., transaction application) within range of the merchant device may receive the message and communicate with the device via the background communications.

In addition, a payment device may be configured to send messages indicating to merchant devices within range of the payment device that the device can communicate messages via the background (e.g., non-standard) protocol with a compatible merchant device. In this regard, the payment device (e.g., an application running on the payment device, such as in the background) may intermittently attempt to provide a message to merchant devices within range of the payment device. If a merchant device receives a message from the payment device and responds with a message indicating that the merchant device is compatible, the payment device may communicate messages with the merchant according to the background protocol.

Messages exchanged between payment device and payment reader can provide payment information for facilitating payment transactions, but in some embodiments, the messages may include various other information. Messages may include offers, such as from a merchant, card issuer, loyalty program, customer information, merchant information, product manufacturer, other suitable related information, and suitable combinations thereof. In some embodiments, the messages may include a request for approval by a user of the payment device to switch a payment method of the payment device from a standard transaction application to a background transaction application. Note that the messaging may be performed via either standard background protocol and in some embodiments, can be performed where messages from each of the payment reader and payment device exchanges messages according to the same protocol or according to a different protocol.

In some embodiments, messages according to the background protocol can be provided via the same transaction application as standard protocol messaging. For example, a payment device running a single transaction application can exchange standard and background messages. In this regard, an application on a payment device may communicate both with payment readers configured to communicate according to standard protocols and payment readers configured to communicate according to background channels and protocol. In addition, the transaction application may communicate both standard and background protocol messages simultaneously, such as based on instructions stored in memory or in response to an input received from a user. In some embodiments, either or both types of messages can be provided via an application running in the background on a payment device in a manner that does not require an input from a user (e.g., transparent to a user).

A compatible device (e.g., payment reader, merchant device, server, or other similar device) may include various settings that allow the device to process messages. The settings may be implemented in software and stored as instructions (e.g., as part of a transaction application) in memory at the device, but in some embodiments, the settings may be stored elsewhere. The compatible device may be used to provide messages to a user, such as via a user interface generated by a transaction application on the device. A message provided to the user may provide the user an opportunity to select a payment type, such as by switching payment types (e.g., from standard to non-standard, etc.), or to receive an offer, such as a discount, obtain a loyalty offer, receive cash back, and other similar functionality.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a transaction application. The merchant has a payment terminal 20 such as a payment terminal or other electronic device that is capable of processing payment information (e.g., encrypted payment card data and user authentication data) and transaction information (e.g., purchase amount and point-of-purchase information), and engaging in additional communications with a payment device to exchange other related information. Exemplary merchant terminals include dedicated payment terminals as well as other computing devices such as a smart phone or tablet running a transaction application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the payment device for display at a screen of the smart phone or watch or storage in memory.

Note that a payment device 10 can be various types of devices, such as a payment card, proxy card, mobile device, smart phone, smart watch, tablet, or other electronic device. In some embodiments, payment device 10 may be an electronic device, which may generate and provide payment card information electronically, such as a virtual card implemented in software, a proximity cards or objects (e.g., PICCs, etc.), virtual (e.g., emulated) card, or other payment object. As an example, a transaction application may be installed and running on a mobile device, and may display a payment card, such as a virtual payment card according to standard or background protocol that may be used to communicate payment information to a compatible payment reader via NFC. The payment device 10 may include a plurality of transaction applications, which in turn may generate a plurality of payment cards that can be used for payment transactions.

In some embodiments, when payment device 10 is a mobile electronic device, the mobile device capable of running one or more transaction applications. In some embodiments, the payment device 10 may be configured to run background operations based, for example, during normal operation of the payment device or in response to a stimulus such as entering certain locations, accessing a payment device, moving a payment device in a particular manner (e.g., in response to motion sensed by motion sensors, microphones, light sensors, etc.), and other similar indicators that a background application may wish to process information relating to a transaction or potential transaction. The device 10 may also run an application in the foreground during operation of the payment device 10, such as by displaying a user interface at a display of the device 10 to allow the user to provide inputs and selections and make payments via the transaction application. In some embodiments, the background operations may be running in the background during operation of the payment device 10, such as without displaying a user interface, while the foreground application are running on the device in the foreground. In some embodiments, the background operations may communicate with the foreground application or operations. Whether an application is running in the foreground or background during operation of the device 10, the device 10 may be configured to perform various operations involving payment cards, such as exchanging standard and background protocol messages and otherwise communicating with other electronic devices (e.g., payment terminals 20, payment servers 40, etc.).

In embodiments, the merchant terminal 20 may include compatible programs to communicate with background and foreground applications and operations. In some embodiments, a merchant terminal may include custom programs and software installed (e.g., in firmware) of the merchant device, that facilitate background and foreground operations and applications within a protected application environment (e.g., running on physically and/or logically protected hardware and/or software operating on the merchant terminal 20. In some embodiments, certain background operations or portions thereof may be operated on applications running on an operating system, or distributed between multiple devices of a merchant terminal 20 or other devices in communication therewith.

Figure 2:
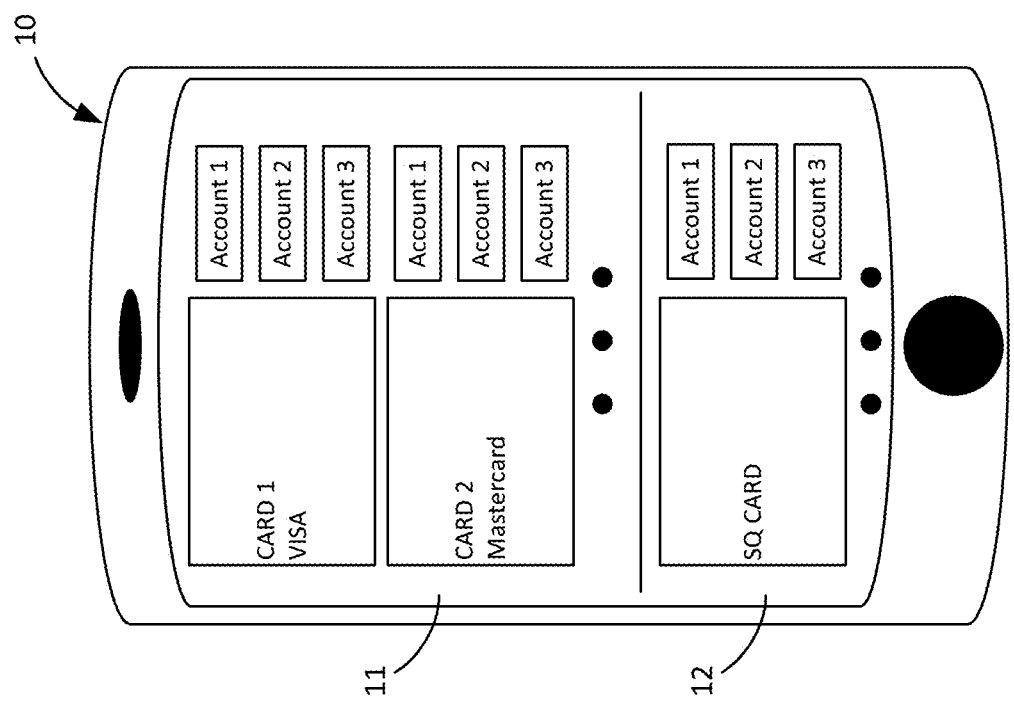
FIG. 2 depicts a mobile device running an account and transaction application in accordance with some embodiments of the present disclosure.

FIG. 2 depicts an exemplary graphical user interface (GUI) of a payment device 10 in accordance with some embodiments of the present disclosure. In the embodiment of FIG. 2, the payment device 10 is a mobile device 10 running a transaction processing application in the foreground and background, with a foreground portion 11 and a display of background 12 processing. In an exemplary embodiment of FIG. 2, the foreground and background display may be split into unique regions or portions 11 and 12, although in other embodiments the portions may be integrated. Items displayed via the GUI may be visible to a user, who may make selections corresponding to payment cards based on the displayed items, e.g., in the exemplary embodiment of a GUI for a mobile device, by selection of items displayed on the GUI. Payment card information may be displayed in various ways by a transaction application, including use of graphical objects, icons, audio prompts, gesture recognition, and other similar user interface technologies. Note that payment cards associated with each of standard and background payment types may be displayed and managed by a transaction application, and may be displayed simultaneously to a user, such as is depicted by FIG. 2.

In some embodiments, a mobile device 10 may store transaction applications in memory, such as a memory of the mobile device 10. Various numbers of transaction applications may be installed and stored on the mobile device 10, and may be executable by a processing element of the mobile device 10. Some applications may have multiple types of accounts associated with a user, device, or other criteria. For example, a user may have an account with a payment card issuer, such as a credit card issuer. A user also may have loyalty and other types of accounts, such as may be offered by a merchant, manufacturer, banking institution, transaction application facilitator, payment card issuer, service provider, or other similar entity. In some embodiments, an account in the transaction application may be created that is associated with the user's payment card account. Whenever the user wishes to use that payment card account to provide payment information as part of a payment transaction, the user may provide a selection via the transaction application indicative of the user's selection of that specific account. The transaction application may then provide payment card information associated with the selected account. Note that the foreground and background applications running on a payment device 10 may communicate payment information wirelessly via a wireless interface of the payment device 10 (e.g., via NFC, Bluetooth, Wi-Fi, etc.), and may exchange messages with other devices multiple protocols (e.g., exchanging messages according to standard or background protocols). A mobile device 10 may communicate messages based on a transaction application by other techniques in other embodiments.

In some embodiments, foreground and background transaction messages can be exchanged with other electronic devices (e.g., payment terminal 20, payment server 40, etc.) as wireless messages using NFC capability of payment device 10 or other protocols such as Bluetooth or WiFi. For example, transaction messages may be sent and received by a payment device 10 when a payment terminal 20 configured to communicate wirelessly is within range of wireless communication with the payment device. In some embodiments, a mobile device 10 may generate and format a transaction message according to protocol suitable for transmission via Bluetooth or other short-range communication protocol. Similarly, transaction messages may be communicated over a wireless network, such as a cellular network. In some embodiments, messages may be communicated wirelessly to other devices via a LAN, such as using a Wi-Fi connection or other similar communication technology.

In some embodiments, multiple transaction applications installed on mobile device 10 may be run (e.g., be initiated to perform operations) as a foreground application (e.g., a primary application such as a payment app) and a background application (e.g., with some or all of the operations being performed in the background without user interaction). Some applications may be configured to perform operations when the payment device 10 transitions from a sleep state (e.g., a processor of the mobile device 10 begins processing, such as based on an input from a user). Such applications may be configured to run in the background on the mobile device 10, regardless of whether a user selects the application to bring it into the foreground. Transaction applications may be run in various manners in other embodiments.

Some transaction applications can be standard transaction applications and may perform transaction messaging and provide transaction information via standard protocols. Such standard transaction applications may store payment card accounts associated with standard payment card types according to a standardized payment card protocol.

In some embodiments, a user can select from information displayed on a GUI generated by the transaction application and displayed by mobile device 10. In some embodiments, the user may make a selection by providing an input, such as a touch selection, via the GUI. A transaction application may provide prompts to a user via the GUI to assist in selecting a transaction type, selecting a payment option (e.g., payment or loyalty card account, type, etc.), selecting loyalty programs, preselecting items, processing coupons or offers, and other similar functionality. In some embodiments, the transaction application can provide instructions via the GUI to guide the user through steps based on information received via the background operations and/or user selections. In some embodiments, the transaction application may provide the user different options associated with information determined or accessed by the payment application, including association of available loyalty programs with the transaction, types of payment accounts to display (e.g., standard payment card or background payment card) to use for the particular payment transaction, offers for purchase or particular payment accounts, and other similar information that may be used to assist with a transaction. In some cases this functionality can be can be facilitated by an application operating in the background that is in communication with a payment terminal 20 (e.g., payment reader 22), in accordance with information such as user information (e.g., user consents pursuant to terms and conditions or other agreement associated with use of the transaction application), merchant information, and merchant device information. The application may exchange messages as required via a background communication channel in order to perform payment and loyalty card selection and processing transparently to the user.

In some embodiments, payment, loyalty, other cards, offers, and suggestions may be selected by a transaction application running in the background. For example, a transaction application may determine that a user is likely to select a particular payment or loyalty card for use in completing a payment transaction. The mobile device 10 (e.g., running the transaction application) may make such a determination based on information received via communication with another electronic device, such as based on communication with a payment terminal 20 (e.g., payment reader 22, merchant device 29, etc.) based on information associated with a payment transaction in which the user may be likely to engage, or based on other related information such as a location of the mobile device 10 (e.g., using information about a location of the mobile device 10 determined via GPS, sensors, or other similar technologies). Some transaction applications may provide suggestions based on user selections, such as a user may provide to select a payment or loyalty card or payment type via the GUI associated with the transaction application. The suggestions may be made based on various information, including prior selections of payment and loyalty cards by the user at the same location on previous occasions, or other information. In addition, a standard transaction application (e.g., running in the foreground of mobile device 10) can provide payment card and loyalty information to payment terminal 20 via transaction messages, as described herein.

In some embodiments, a transaction application running on a mobile device 10 may be configured to provide additional background messages to the payment terminal 20 at various times based on user selections and contextual information. Contextual information may include information such as location of the mobile device 10, location of the payment terminal 20, a user's account information (e.g., user or merchant identity, payment card or loyalty card preferences), merchant device types located in proximity to the payment device, prior payment or loyalty card transaction history, payment card or loyalty card balances, incentives, standard or background messaging compatibility of each of the payment terminal 20 and mobile device 10 (e.g., compatibility of messaging via a transaction application running in the background), etc. In some embodiments, both standard and non-standard background messages may be provided in parallel (e.g., within a period of time for processing a transaction), during breaks in communications from or to the mobile device 10 and payment terminal 20 (e.g., providing standard or background payment card, loyalty card or account information in the background while other transaction messages are communicated in the foreground), or in other appropriate situations. Whether background communication of messages may be performed in parallel, during breaks in communications, or in other appropriate situations may be determined based on user selections, contextual information, rules determined at a payment server (e.g., payment server 40), and based on similar information related to a user, merchant, transaction, merchant device, etc.

In some embodiments, mobile device 10 may provide transaction messages for various payment card types. Payment card types may vary, but in some embodiments, a payment card generally may be of a standard card protocol or background card protocol type. In this regard, messages associated with a payment card type may be communicated between compatible devices according to required (e.g., standardized) protocols as dictated by various entities. For example, a mobile device 10 configured to communicate messages according to a standard card protocol may communicate with a payment terminal 20 compatible with standard card protocol messaging. Similarly, a mobile device 10 may be configured to communicate messages according to a background protocol with a compatible payment terminal 20. In some embodiments, the mobile device 10 and payment terminal 20 each may be configured to communicate transaction messages according to both a standard and background protocol. Other types of transaction messages may be exchanged between mobile device 10 and other devices (e.g., payment server 40, etc.) according to other protocols in other embodiments.

Examples of payment card messaging using standard protocol may include protocols and standards promulgated by Visa, MasterCard, EMV Co., ISO/IEC, or other payment card issuers or standards management entities. Messages according to a standard protocol may be generated and formatted in a particular manner, which may specify various aspects of message construction, management and processing, such as byte formatting, frames, timing, etc.

Examples of background protocol can include messages including information associated with or related to loyalty programs, coupons, gift cards, proprietary transaction application messaging, merchant devices, payment service systems, payment rules, and applications. In an exemplary embodiment, background messages may be processed by particular merchant devices having installed firmware and/ or by applications that are able to communicate with a payment service system having capability to process such background communications.

In the exemplary GUI of FIG. 2, a foreground display portion includes standard payment cards CARD 1 (VISA) and CARD 2 (MasterCard), as well as background card SQ CARD (Square Cash). In some embodiments each of the payment cards may be associated with one or more accounts, such as loyalty accounts or other accounts related to a user, device, merchant, or merchant device.

Note that the mobile device 10 may be configured to communicate both standard protocol (e.g., payment information) and background protocol (loyalty program information) messages wirelessly to payment terminal 20 (e.g., payment reader 22), such as via NFC. In this regard, a protocol may refer to a communications protocol (e.g., NFC, Bluetooth, WiFi) or a particular aspect thereof, an underlying messaging protocol (e.g., for EMV communications), or any other suitable communication level within a messaging stack.

The mobile device 10 also may receive other information from the payment terminal 20. In some embodiments, information communicated to the mobile device 10 may include information based on background information provided by background application. For example, mobile device 10 (e.g., the transaction application) may receive a message including a prompt or notification for interaction with a user, such as an offer to the user an opportunity to change or switch from one account to another account in order to receive an offer, such as a discount, cash back, or reduced interest rate. In addition, a prompt offering a user an opportunity to associate or add one or more loyalty cards for association with the transaction may be provided based on the background information. Other information may be provided to the mobile device 10 based on background information provided (e.g., to payment terminal 20, to payment server 40, etc.) by the background application running on the mobile device 10.

Although FIG. 2 has been described with respect to a GUI displayed on a mobile device 10, it will be understood that a variety of suitable payment devices 10 may be utilized to perform processing and user communication regarding foreground and background processing of payment transactions, such as proxy cards providing indications to a user, augmented reality displays, audio prompts, and other modes of providing processing, presenting information to a user, and receiving user inputs.

Figure 3:
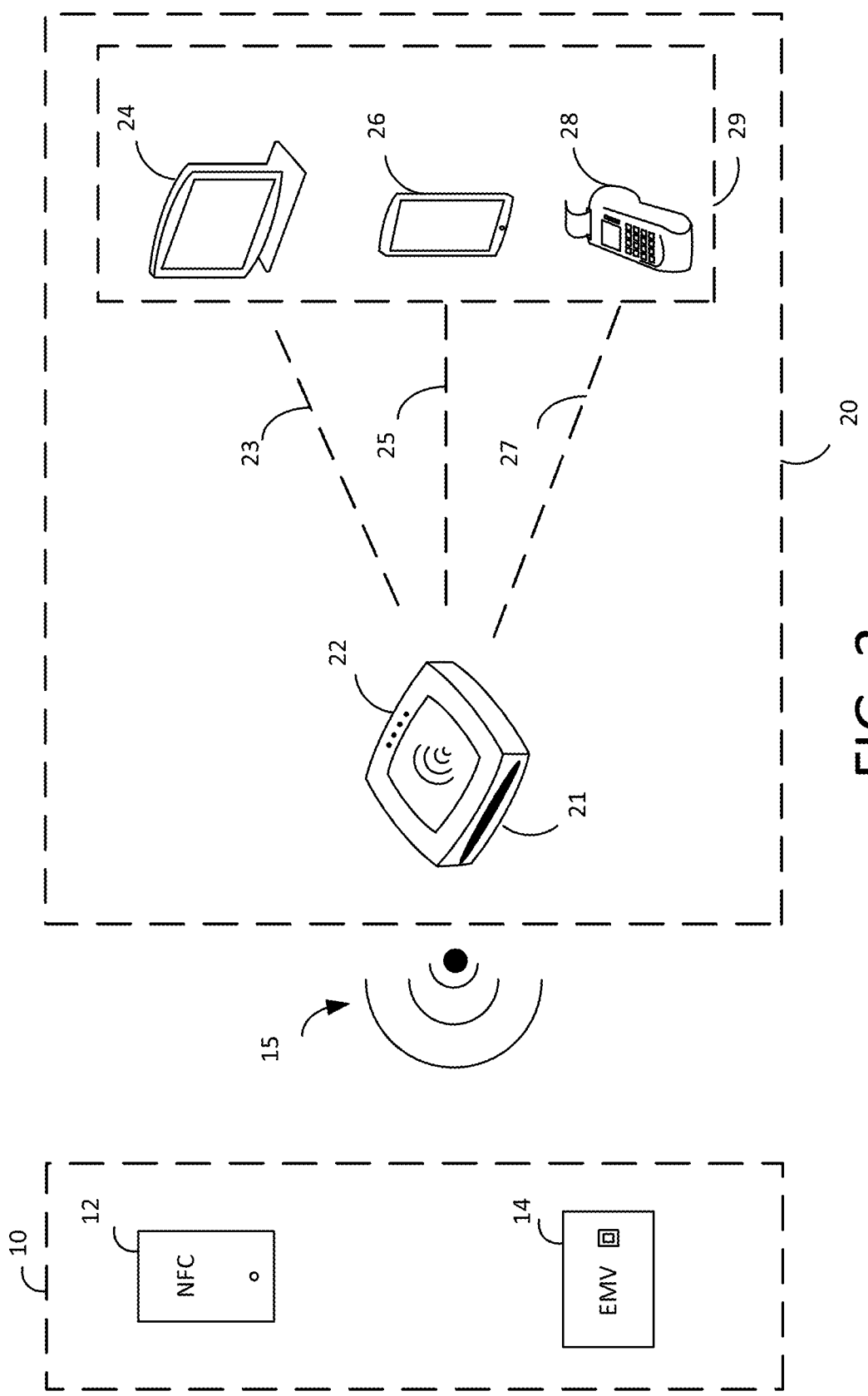
FIG. 3 depicts an illustrative block diagram of a payment device and payment terminal in accordance with some embodiments of the present disclosure.

FIG. 3 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term payment terminal may refer to any suitable component of the payment terminal, such as payment reader 22. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443. In addition, payment device 10 may include other wired and wireless communications interfaces such as Bluetooth and WiFi, for communications with payment terminal 20 and any suitable component thereof, as well as with other devices that may facilitate background transaction processing.

NFC device 12 may be an electronic device such as a smart phone, tablet, or smart watch that is capable of engaging in secure transactions with payment terminal 20

(e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g., by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a transaction application may provide a menu of services that a merchant is able to select and a series of menus or screens for automating a transaction. A transaction application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 4:
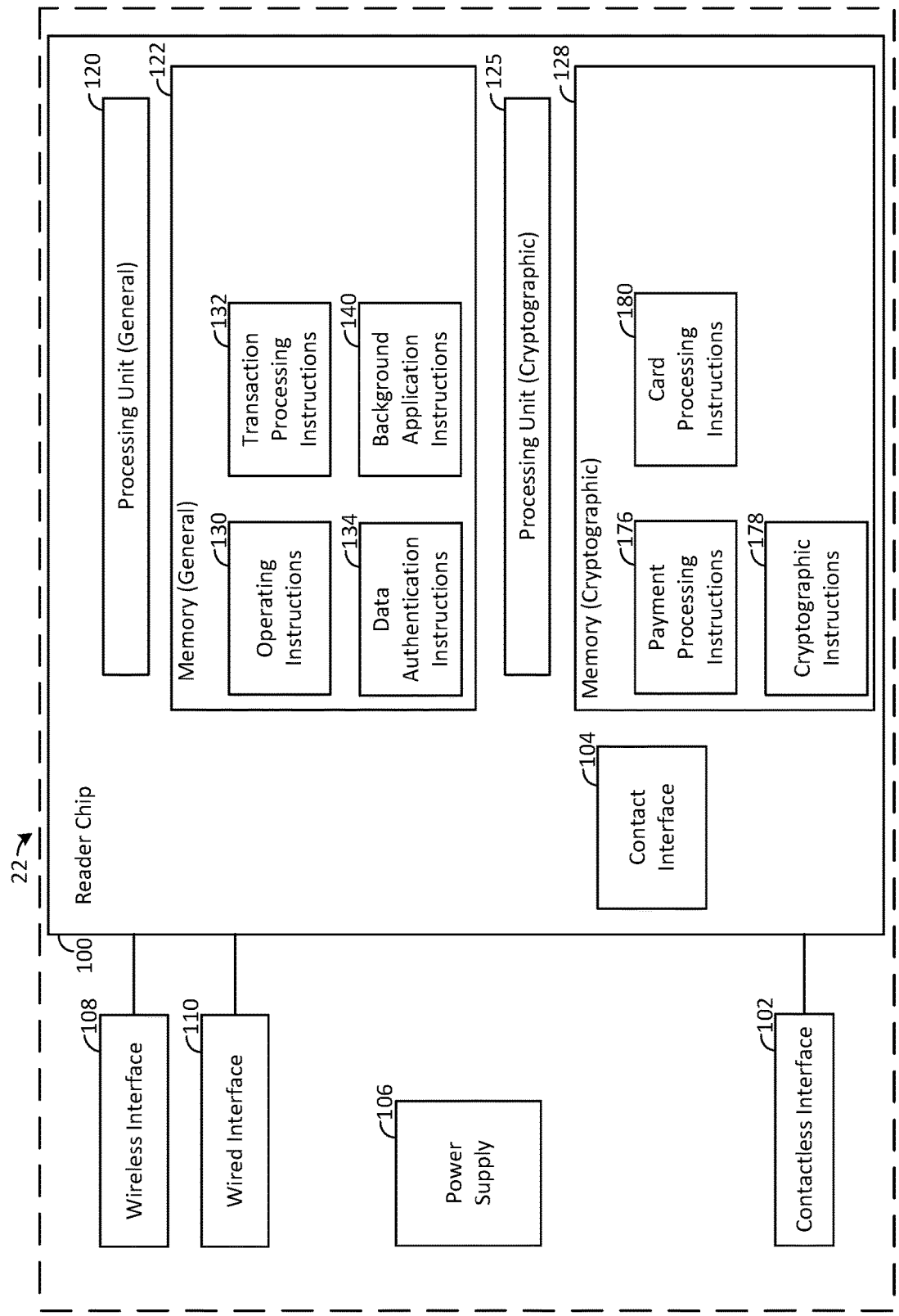
FIG. 4 depicts an illustrative block diagram of a payment reader in accordance with some embodiments of the present disclosure.

FIG. 4 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 4, it will be understood that payment reader 22 may include additional components, one or more of the components depicted in FIG. 4 may not be included in payment reader 22, and the components of payment reader 22 may be rearranged in any suitable manner. In one embodiment, payment reader 22 includes a reader chip 100, a plurality of payment interfaces (e.g., a contactless interface 102 and a contact interface 104), a power supply 106, a wireless communication interface 108, and a wired communication interface 110. Payment reader 22 may also include a general processing unit 120 (e.g., a terminal/reader processing unit), general memory 122, a cryptographic processing unit 125, and cryptographic memory 128. Although in one embodiment the processing units and memories will be described as packaged in a reader chip 100, and configured in a particular manner, it will be understood that general processing unit 120, general memory 122, a cryptographic processing unit 125 and cryptographic memory 128 may be configured in any suitable manner to perform the functionality of the payment reader 22 as is described herein. It will also be understood that the functionality of reader chip 100 may be embodied in a single chip or a plurality of chips, each including any suitable combination of processing units and memory to collectively perform the functionality of reader chip 100 described herein.

In some embodiments, processing unit 120 of reader chip 100 of payment reader 22 may be a suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired communication interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

In an exemplary embodiment, reader chip 100 may perform functionality relating to processing of payment transactions, interfacing with payment devices, cryptography, and other payment-specific functionality. In some embodiments, reader chip 100 may include a cryptographic processing unit 125 for handling cryptographic processing operations. Note that each of general processing unit 120 and cryptographic processing unit 125 may have dedicated memory associated therewith (i.e., general memory 122 and cryptographic memory 128). In this manner, specific cryptographic processing and critical security information (e.g., cryptographic keys, passwords, user information, etc.), may be securely stored by cryptographic memory 128 and processed by cryptographic processing unit 125.

One or both of general processing unit 120 and cryptographic processing unit 125 of reader chip 100 may communicate with the other (e.g., processing unit 120 may communicate with cryptographic processing unit 125 and vice versa), for example, using any suitable internal bus and communication technique. In this manner, reader chip 100 can process transactions and communicate information regarding processed transactions (e.g., with merchant device 29).

Reader chip 100 may also include circuitry for implementing a contact interface 104 (e.g., power and communication circuitry for directly interfacing with an EMV chip of a chip card 14 that is inserted into slot 21). In some embodiments, reader chip 100 also may also include analog front end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 4) For physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card 14 are able to exchange information such as payment information.

Power supply 106 may include one or more power supplies such as a physical connection to AC power, DC power, or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 4, power supply 106 may supply a variety of voltages to the components of the payment reader 22 in accordance with the requirements of those components.

Wireless communication interface 108 may include suitable wireless communications hardware (e.g., antennas, matching circuitry, etc.) and one or more processors having processing capability necessary to engage in wireless communication (e.g., with a merchant device 29 or a payment device 10 via a protocol such as Bluetooth low energy) and control associated circuitry, including but not limited to hardware logic, computer readable instructions running on a processor, or any suitable combination thereof.

Wired communication interface 110 may include any suitable interface for wired communication with other devices or a communication network, such as USB, Lightning, FireWire, Ethernet, any other suitable wired communication interface, or any combination thereof. In some embodiments, wired communication interface 110 may allow payment reader to communicate with one or both of merchant device 29 and payment server 40.

In some embodiments, general memory 122 may include a plurality of sets of instructions for controlling operations of payment reader 22 and performing general transaction processing operations of payment reader 22, such as operating instructions 130, transaction processing instructions 132, data authentication instructions 134, and background application instructions 140.

Operating instructions 130 may include instructions for controlling general operations of the payment reader 22, such as internal communications, power management, processing of messages, system monitoring, sleep modes, user interface response and control, operation of the contact interface 104, the wireless interface 108, or the wired interface 110, and the management of the other sets of instructions. In one embodiment, the operating instructions 130 may provide the operating system and applications necessary to perform much of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, facilitating processing by background application instructions 140, and invoking the various resources of reader chip 100 to process that payment information (e.g., by executing memories stored in cryptographic memory 128 using cryptographic processing unit 125), and by generating responsive messages that are transmitted to the point-of-sale application of the merchant device 29 via wireless communication interface 108 and wired communication interface 110.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, aggregating transaction data, and communicating background information to facilitate transaction processing. The payment reader 22 may process payment information (e.g., based on operation of reader chip 100) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Transaction processing instructions 132 also may include instructions for processing payment transactions at payment reader 22. In one embodiment, the transaction processing instructions may be compliant with a payment standard such as those promulgated by EMV. Depending on the payment method that is being used (e.g., Europay, MasterCard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with cryptographic processing unit 125 to perform most transaction processing operations. In addition, transaction processing instructions 132 may provide instructions for acquiring any suitable information from a chip card (e.g., via contact interface 104 and cryptographic processing unit 125) such as authorization responses, card user name, card expiration, etc.

Transaction processing instructions 132 may include instructions for processing payment transactions using various payment card types. For example, a transaction application running on a mobile device 10 (e.g., a mobile device) may be configured to provide payment information associated with various types of payment cards to payment reader 22 (e.g., via standard and background protocol messages). The payment card types may include standardized payment card types (e.g., Visa, MasterCard, etc.) and other information related information such as loyalty and account information. The mobile device 10 may establish a wireless communication connection with the payment reader 22 (e.g., via NFC protocol) and communicate messages to the payment reader 22. Transaction processing instructions 132 may include instructions for receiving the transaction messages from the payment device 10 that comply with standardized payment card protocol. The payment reader 22 may process the payment messages as described further below.

In some embodiments, transaction processing instructions 132 may include instructions for receiving a request for processing payment transaction from payment terminal 20, such as from merchant device 29. As part of a payment transaction, a merchant may enter transactional information (e.g., payment amount, item quantity, type or value, etc.) at a merchant device 29. The merchant device 29 may provide a message to the payment reader 22 that includes the information and a request to process the payment transaction wirelessly (e.g., via NFC protocol). The transaction processing instructions 132 may include instructions for receiving transaction messages sent wirelessly from a mobile device 10 running a transaction application.

In some embodiments, the transaction processing instructions 132 may include instructions for communicating transaction messages for the various payment card types. As indicated herein, a transaction application on a mobile device 10 may store information associated with a user's accounts with various payment card issuers (e.g., debit or credit cards), financial institutions, payment facilitators and others. The payment card types may vary by issuer, such as Visa, MasterCard, American Express, merchant payment cards, merchant-device related accounts, and other payment card types. Transaction card types stored by the mobile device 10 and used by the transaction application may be a payment card for providing payment information, loyalty program information (such as may be offered by an issuer of a payment card, a rewards program, merchant), and other identifying accounts as described herein.

In some embodiments, transaction processing instructions 132 may include instructions for receiving and processing transaction messages from multiple transaction applications that may be installed and run on mobile device 10. In some embodiments, mobile device 10 may be compatible with various applications, such as Apple Pay, Android Pay, or other similar application. As an example, the transaction applications may store a user's information for various payment card types associated with various payment card accounts. A message may be sent to the payment reader 22 based on a user's selection of a preferred payment card type or account when the transaction application is running in the foreground (e.g., displayed via GUI of the payment device 10). Transaction processing instructions 132 may include instructions for receiving such messages indicative of payment information from the transaction applications of mobile device 10 (e.g., based on the standardized payment card protocol) and processing their payment information to complete a payment transaction.

In some embodiments, a message provided from a transaction application of a mobile device 10 may include a listing of all standardized payment card types supported by the mobile device 10. In addition, the message may include information indicative of a priority or ranking of the standardized payment card types (e.g., such as defined by a user or based on other information, such as incentives, offers, transaction history, etc.). In some embodiments, transaction processing instructions 132 may include instructions for enabling payment reader 22 to select a payment card type for processing at least a portion of a particular payment transaction based on an indicated priority of supported payment card applications on mobile device 10. After the payment reader 22 determines a payment card type for processing at least one portion of a particular transaction, transaction processing instructions 132 may include instructions for disregarding other payment card types for the particular at least one portion of the transaction.

Data authentication instructions 134 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 134 may include configuration instructions such as TMS-CAPK instructions. In some embodiments, the TMS-CAPK may be tailored for a particular jurisdiction (e.g., country-specific).

Background application instructions 140 may include instructions for performing specialized routines for processing background messages (e.g., background payment accounts, loyalty accounts, offer information, etc., communicated via background communications). The specialized routines specified in background application instructions 140 may include instructions for processing messages sent by a transaction application running in the background on a mobile device 10, as well related as other communication devices such as merchant devices, a payment service system, etc. The messages processed according to the specialized routines set forth in background application instructions 140 may be implemented to process messaging received wirelessly from the mobile device 10, such as via NFC, Bluetooth, or Wi-Fi.

In some embodiments, background application instructions 140 may include instructions for managing a separate wireless communication thread (BLE, Wi-Fi, or NFC) between payment reader 22 and mobile device 10. In some embodiments, the separate wireless communication thread may be implemented to handle or manage any background communications with transaction applications that may occur. In an embodiment, the background application instructions 140 may include instructions for facilitating messages sent in the background according to a non-standardized protocol from a payment facilitator's proprietary transaction application, such as an application that is associated with a merchant devices and/or a payment service system. The background application instructions 140 may include instructions for allowing payment reader 22 to receive messages sent via background communications simultaneously with messages received via regular wireless communication threads (e.g., foreground communication). The payment reader 22 may receive standard type transaction card-type messages and background transaction card-type messages and decide how to use some or all of the information in processing the payment transaction, or in some embodiments, package some or all of the standard and background information by additional processing at another device (e.g., a merchant device and/or a payment service system).

In some embodiments, the background application instructions 140 may include instructions for sending and receiving messages with information that identifies the payment reader 22 to mobile devices 10 within range of the messaging as a payment reader that is compatible with a transaction application operating in the background on the mobile device 10. For example, a payment reader 22 or payment device 10 may intermittently broadcast a message indicating such compatibility, such as via wireless communication; any compatible device within range of or in communication with the payment reader 22 or payment device 10 may receive the message. In some embodiments, the payment reader 22 may broadcast or transmit such a message any time a message is received from a mobile device 10. In addition, the instructions 140 may include instructions for examining information from a mobile device 10 to determine whether the mobile device 10 is a background application-enabled device. For example, an identifier may be present within messaging from the payment device 10, or the payment reader 22 may query the mobile device 10 and determine whether it is a background application-enabled device based on a response message. In this regard, the background application instructions 140 may include instructions for enabling a payment reader 22 to efficiently identify compatible payment devices 10 to take advantage of background messaging capability where available.

In addition, background application instructions 140 may include instructions for sending offers, promotions, coupons, advertisements, etc., to a mobile device 10 for display to user. In some embodiments, background application instructions 140 may include instructions for generating a message indicative of an offer or other information and broadcasting the message to any mobile devices 10 within range (e.g., a message sent as a wireless "beacon" signal). In some embodiments, the background application instructions 140 may include instructions for generating a beacon to provide options to user of transaction application to perform various operations. For example, the beacon may prompt or offer a user an opportunity to switch a payment card application for use with the payment transaction, such as a prompt to agree to switch from a standard payment card application to a background application, such as when the user may derive a benefit (e.g., a merchant or issuer's promotional offer, loyalty incentives, etc.). In some embodiments, background application instructions 140 may require a user response accepting offer before processing a payment card type according to background protocol, while in other embodiments, information may be received from both the standard and background application and processed elsewhere (e.g., at a merchant device or payment service system based on user preferences). The beacon message may include instructions for the background compatible application to generate a message indicative of the user's response and provide it to the payment reader 22. If the user agrees to permit a switch to the background transaction application, the mobile device 10 may transition the background transaction application or a portion thereof to the foreground, receive user inputs and selections related to the payment transaction, and complete at least a portion of the payment transaction with the payment reader 22 via messaging according to the background payment protocol.

Note that, in some embodiments, background application instructions 140 may include instructions for selecting a portion of a payment transaction to process using a standard payment card type and a portion of a payment transaction to process using background payment card type. In some embodiments, a payment card type (e.g., standardized versus non-standardized) may be selected for a portion of the payment transaction based on various information, such as priority rules included in background application instructions 140. Based on background application instructions, payment reader 22 may make the selection based on information such as instructions stored in memory of the payment reader, rules stored at the merchant device 29, and/or rules stored at a payment server 40.

In addition, background application instructions 140 may include instructions for determining that at least one portion of a wireless payment transaction may be performed by using exclusively a background payment card, and processing the at least one portion using the background payment card based on the determination. In some embodiments, the background application instructions 140 may include instructions for completing the at least one portion of the payment transaction using the background payment card without processing any portion using a standardized payment card type. In some embodiments, the at least one portion may be processed using a standardized payment card based on a determination that the at least one portion may be processed using exclusively the standardized payment card type.

In some embodiments, the background application instructions 140 may include instructions for accessing user rules to generate and provide the offers or options to the mobile device 10. In some embodiments, background application instructions 140 may include instructions for communicating with a server (e.g., payment server 40) to access rules generated for the particular user of the payment device (e.g., a user associated with one or more background payment card applications for which the payment device 10 has indicated compatibility). The rules may specify conditions for performing (e.g., the extent to which) background communications between the payment reader 22 and mobile device 10. Background application instructions 140 may include instructions for customizing offers, promotions, prompts or options provided to a payment device 10 for presentation to a user based on the customized rules. The customization performed based on background application instructions 140 may be performed based on other information and rules stored at other locations in other embodiments.

In some embodiments, background application instructions 140 may include instructions for enabling the payment reader 22 to route information received based on execution of both transaction processing instructions 132 and background application instructions 140 to an appropriate destination (e.g., a merchant device 29, or payment server 40). In some embodiments, the background application instructions 140 may include instructions for routing all information received to the appropriate destination, such as a merchant device 29 or payment server 40. In this regard, selection of a payment method for at least a portion of the payment transaction may be performed based on the information. In some embodiments an appropriate destination may be identified based on settings or rules (e.g., from payment server 40 or elsewhere). In some embodiments, the information may be routed based on communication by the payment reader with a transaction application running in the background on the mobile device 10 (e.g., for presenting offers or incentives to a user).

In some embodiments, the background application instructions 140 may include instructions for providing point-of-sale options to a user (e.g., via an application running in the background of the mobile device 10). For example, an option may be presented to a user offering the user an opportunity to change payment card type (e.g., from standard to background payment card type, or vice versa) or to associate a loyalty payment card, such as the user's own loyalty account, with the transaction. Other point-of-sale options may be provided to the user in other embodiments. As an example of operation of processing a wireless payment transaction based on standard and background payment card types at the payment reader 22 when executing at least transaction processing instructions 132 and background application instruction 140, payment reader 22 may initially identify a standardized payment card (e.g., a payment card for processing a standardized-protocol payment transaction) from a listing of standardized payment card types. The payment reader 22 may use the identification to process at least a first portion of the wireless payment transaction.

The payment reader 22 may provide information to a first remote server (e.g., payment server 40, etc.) for the first remote server to authorize payment of the at least first portion of the wireless payment transaction by the standardized payment card identified by the payment reader 22. In some embodiments, the information may be provided via at least one communication network (e.g., network 30). In some embodiments, the information for authorizing payment of the at least first portion may comply with the standardized payment card protocol.

The payment reader 22 may further identify a background payment card from a listing of background payment card types (e.g., a loyalty card for processing a loyalty card transaction). The payment reader 22 may use the identification to process at least a second portion of the wireless payment transaction.

The payment reader 22 may provide information to a second remote server (e.g., payment server 40, etc.) for the second remote server to authorize payment of the at least second portion of the wireless payment transaction by the background payment card identified by the payment reader 22. In some embodiments, the information may be provided via the at least one communication network (e.g., network 30). In some embodiments, the information for authorizing payment of the at least second portion may not comply with the standardized payment card protocol.

In some embodiments, the payment reader 22 may receive an authorization for each of the at least first portion and at least second portion of the wireless payment transaction, such as from each respective first and second remote server. The payment reader 22 may complete the payment transaction (e.g., approve or decline the transaction) upon receiving both of the authorizations for the at least first portion and at least second portion of the wireless payment transaction.

Note that, in some embodiments, payment reader 22 may require a response from a user authorizing use of a background payment card before identifying and processing the at least second portion of the wireless payment transaction. The response may be provided following receipt by the user of an offer to switch to a background payment card type from the standard payment card type identified to process the at least first portion of the payment transaction. If the user declines the offer, payment reader 22 may perform processing of the wireless payment transaction using only standard payment card types from the listing of standardized payment card types. The offer may be provided to the user via a wireless message from the payment reader 22, such as a beacon or other message to a mobile device 10 of the user.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176, cryptographic instructions 178 and card processing instructions 180. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Card processing instructions 180 may include instructions for receiving transaction messages that are received from the payment device 10. For example, a standard or background card messaging protocol may include security formatting or encryption. The cryptographic processing unit 125 may receive and process such messages received from a mobile device 10 based on card processing instructions 180.

In some embodiments, card processing instructions 180 may include instructions for enabling the payment reader to receive card messages that include card-specific information, such as a card-specific identifier (e.g., primary account number, etc.). In some embodiments, a transaction application running on a mobile device 10 may include card payment tokens that may have validity for performing at least one portion of a payment transaction initiated via the mobile device 10 (e.g., from the transaction application) or payment terminal 20. A card payment token may be associated with a card based on various information, including a primary account number (PAN) or payment cryptogram. In some embodiments, a token may be associated with a dynamically generated cryptogram, which may be generated at the mobile device 10 and interpreted when received by the payment reader 22 based on card processing instructions 180. In some embodiments, card processing instructions 180 may include instructions for processing a card payment token received at the payment reader 22 and generated by mobile device 10, or by a remote source such as payment server 40. In some embodiments, card processing instructions 180 may be configured to receive tokenized transaction messages indicative of payment information for either or both of messages according to standard and background payment types, as may be communicated from a transaction application operating in the foreground and a transaction application operating in the background on a mobile device 10.

Note that, in some embodiments, one or more portions of a payment card may be tokenized and transmitted via wireless message to the payment reader 22 as part of a payment transaction. Tokenization may be of various information indicated by a payment card, including typical tokenization of authorization cryptogram information, but also of user account information and other sensitive details. A token can be associated with various validity rules, such as remaining valid for certain transactions, transaction use limits, time limits, transaction types (e.g., wired or wireless), user account limitations (such as association with a particular payment card or loyalty card) or merchant limitations. Based on card processing instructions 180, the payment reader 22 may receive the tokenized portions and process the payment transaction as described herein.

Figure 5:
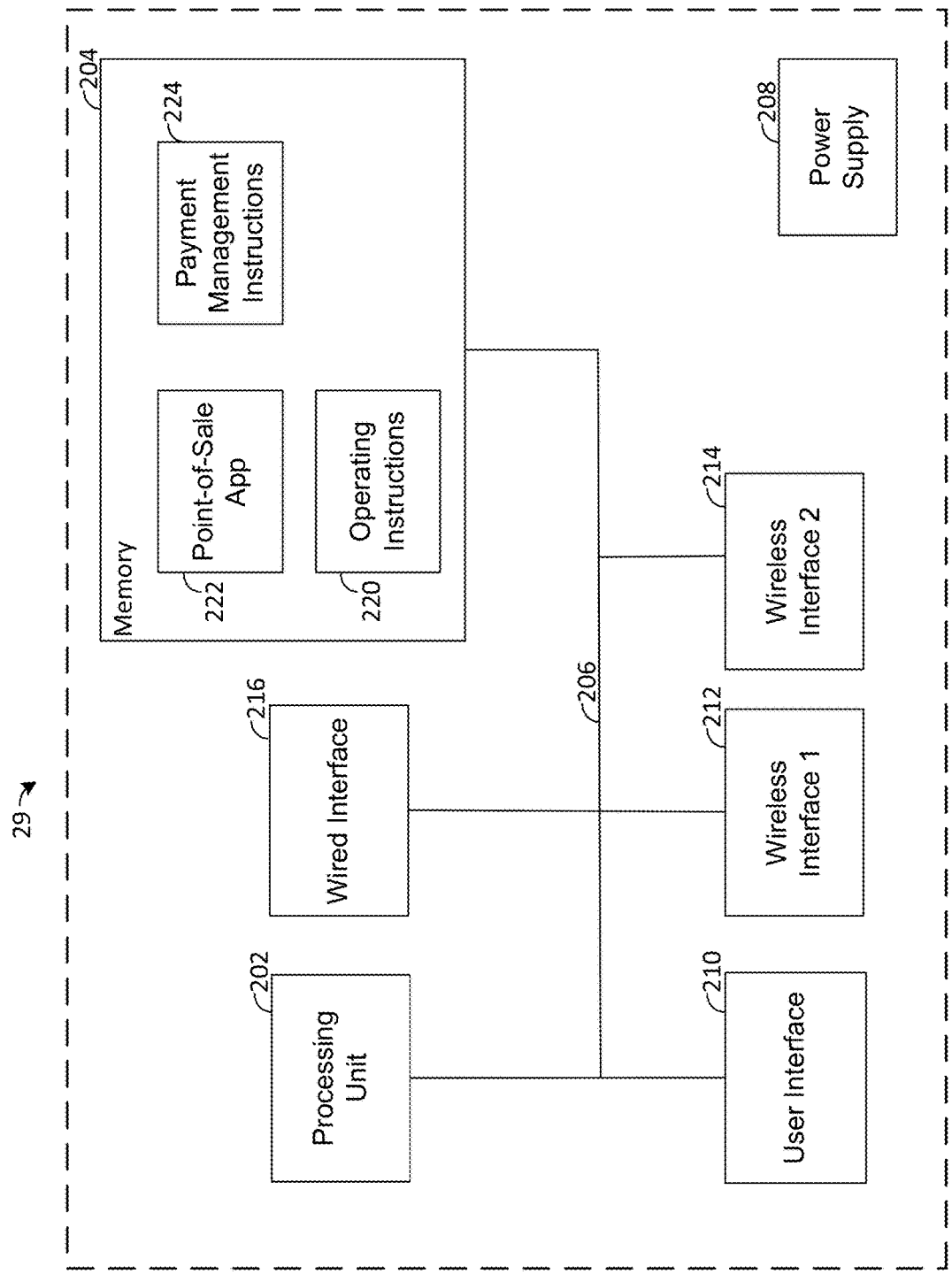
FIG. 5 depicts an illustrative block diagram of a merchant device in accordance with some embodiments of the present disclosure.

FIG. 5 depicts an exemplary merchant device 29 in accordance with some embodiments of the present disclosure. Although merchant device 29 may be implemented in a variety of device types, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, and other suitable electronic devices having the necessary user interface and communication capabilities to perform the functions described herein.

Although particular components are depicted in a particular arrangement in FIG. 5, it will be understood that merchant device 29 may include additional components, one or more of the components depicted in FIG. 5 may not be included in merchant device 29, and the components of merchant device 29 may be rearranged in a variety of suitable manners in order to perform the functionality describe herein. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 of may be a general-purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, and reader management instructions 224.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I²C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 5, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for a suitable user interface such as a touchscreen interface, voice command interface, keyboard, mouse, gesture recognition, any other suitable user interface, or any combination thereof. In one embodiment, the user interface 210 may be a touchscreen and audio interface that displays an interactive user interface and responds to voice prompts in order for a user to interact with programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, Wi-Fi, cellular, short message service (SMS), NFC, any other suitable wireless communication interface, or any combination thereof. In an embodiment, a first wireless communication interface 212 may be a wireless communication interface that communicates with payment reader 22 (e.g., Bluetooth low energy interface) while a second wireless communication interface 214 may be a wireless communication interface (e.g., Wi-Fi) that communicates with a payment service system 50 of payment server 40 (e.g., via the internet). In some embodiments (e.g., when some or all of the background instructions (e.g., background application instructions 140) are executed at the merchant device 29), one or more of the wireless communication interfaces may communicate with a payment device.

Merchant device may also include a wired interface 216, which may include any suitable interface for wired communication with other devices (e.g., a payment reader 22) or a communication network (e.g., to contact a payment server 40), such as USB, Lightning, FireWire, Ethernet, any other suitable wired communication interface, or any combination thereof.

Operating instructions 220 of memory 204 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, payment management instructions 224, and other suitable instructions of the merchant device (e.g., including background application instructions 140 or some portion thereof). In one embodiment, the operating instructions 220 may include instructions to perform communications and user interface operations directly with a payment device 10, e.g., in order for merchant device 29 to perform some or all of the processing of the background application instructions.

Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 may include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions 222 may include instructions for providing a rich display of information relating to settings for interaction with a backup application operating on a payment reader 22 or payment device 29, for example, to modify settings for providing payment options, pre-order options, special offers, payment method preferences (e.g., discounts for selecting a payment method such as a payment method accessible through the background application, and other similar information accessible or operational through a background application as described herein.

In some embodiments, point-of-sale application instructions 222 may provide a register interface to allow a user to enter a payment amount, select items for purchase, and modify purchase options by providing inputs at the user interface 230. The point-of-sale application instructions 222 may remain in this mode until a user provides an input indicating that the user is ready to provide payment information for processing. In some embodiments, point-of-sale application instructions 222 may prompt a user for selection of a payment method. The user may select a payment method based on an indication at the point-of-sale application instructions 222, or by providing an input at the merchant device 29 or payment reader 22. In some embodiments, a payment method may be selected based on interaction of a payment device 10 with an interface of payment reader 22 (e.g., contact interface 104 or contactless interface 102). For example, in some embodiments, point-of-sale application instructions 222 may include instructions for identifying a chip card when it is inserted into contact interface 104 based on a message provided by payment reader 22. In some embodiments, point-of-sale application instructions 222 may include instructions for displaying a customer verification method for obtaining authorization to process a payment transaction on the payment method provided, such as through user input. In some embodiments, the verification method may be a number panel for entry of a unique personal identification number (PIN) or a cardholder's signature. Other methods may be used in other embodiments. In some embodiments, point-of-sale application instructions 222 may provide an indicator that the transaction is complete following approval of the payment transaction at the merchant device 29, such as from a transaction processing server or based on a self-approval provided at the merchant device 29. Point-of-sale application may display the transaction complete indicator at the user interface 230, indicating that the transaction has concluded.

In some embodiments, point-of-sale application instructions 222 may include instructions for performing parallel processing of tasks performed during a payment transaction. For example, payment information from a payment device 10 may be collected and processed before a purchase amount is entered or a user begins selecting items for purchase (e.g., based on background communications with a payment device 10). Following collection of the payment information, tasks such as customer verification methods and finalization of a payment amount may be completed at the point-of-sale application instructions 222 prior to the completion of messaging with the chip card and/or authorization of the transaction. Thus, a continuous flow of tasks in a payment transaction may be provided to the user interface 230 by point-of-sale application instructions 222, reducing transaction duration and customer wait time in accordance with information exchanged via background messaging. In some embodiments, point-of-sale application instructions 222 may include instructions for performing any of the functions of point-of-sale application instructions 222 described herein in parallel with payment processing tasks.

Payment management instructions 224 may include any suitable instructions for assisting with payment card management operations at the payment reader 22. A merchant may initiate a payment transaction at merchant device 29, such as when a customer is making a purchase. The merchant device 29 may provide a payment request to the payment reader 22, which may perform processing of the payment transaction (e.g., by exchanging wireless messages with payment device 10, such as standard and background protocol messaging).

In some embodiments, payment management instructions 224 may include instructions for receiving processed payment card information from payment reader 22. As noted herein, after a mobile device 10 provides payment card information (e.g., listings of standard and background payment card types) to payment reader 22, the payment reader 22 may identify each of a standard card to process at least one portion of the payment transaction and a background card to process at least one other portion of the payment transaction. The payment reader 22 may determine each of the standard and background payment card types from messages comprising listings of each payment card type compatible or supported by the mobile device 10, or in some embodiments, based on information about a user and/or payment device that is available at one or more of a payment reader 22, merchant device 29, or payment service system 50. In some embodiments, the payment reader 22 and/or payment device 10 may provide information from the selected payment card types required to complete the payment transaction to merchant device 29, such as via wired or wireless communication, as described herein.

In some embodiments, the payment management instructions 224 may include some or all of the functionality of the background application instructions 140, e.g., to offload some or all of the background functionality from the payment reader 22. The payment management instructions 224 may also include instructions for forwarding both types of processed information (for each of standard and background payment card types selected at payment reader 22) to remote server. The payment reader 22 may provide information for authorizing each of the portions of the payment transaction (e.g., associated with each of the standard and background payment card type) to the merchant device 29. Based on payment management instructions 224, the merchant device 29 may forward authorization information received from the payment reader 22 to one or more payment servers. Note that the merchant device 29 may make a determination as to where (e.g., to which remote server) to send each portion of the payment transaction based on the payment management instructions 224 (e.g., based on standard or background account type) and may forward the authorization information from each portion to an appropriate server (e.g., one or more payment service systems of payment server 40). Merchant device 29 may forward the payment authorization information from each portion to other locations in other embodiments.

Note that, in some embodiments, the payment management instructions 224 also may include instructions for deciding which processed payment card information to forward to server. For example, merchant device 29 may authorization information associated with a standard payment card type and background payment card type. The merchant device 29 may decide between providing authorization information associated with the standard payment card type versus the background payment card type based on payment management instructions 224. In this regard, merchant device 29 may select a payment type for which to provide authorization information (e.g., authorization request), while not providing authorization information for other payment types received from payment reader.

In some embodiments, payment management instructions 224 may include instructions for receiving rules for selecting processed authorization information for which authorization request should be provided (to a remote server, such as payment server 40). In some embodiments, the rules set forth in payment management instructions 224 may provide for selection based on various types of information, including payment card type, card issuer, merchant information, user information, transaction history, user agreement, and/or consent. In addition to describing instructions for selecting between payment card types, rules contained in payment management instructions 224 may specify rules providing for selection of payment card authorization information based on payment card or loyalty card priorities. In some embodiments, payment management instructions 224 may include instructions for assigning a priority to particular standard or background payment card types and loyalty program types, and performing a selection based on the assigned priority. The payment management instructions 224 may provide rules for performing other techniques in other embodiments.

Figure 6:
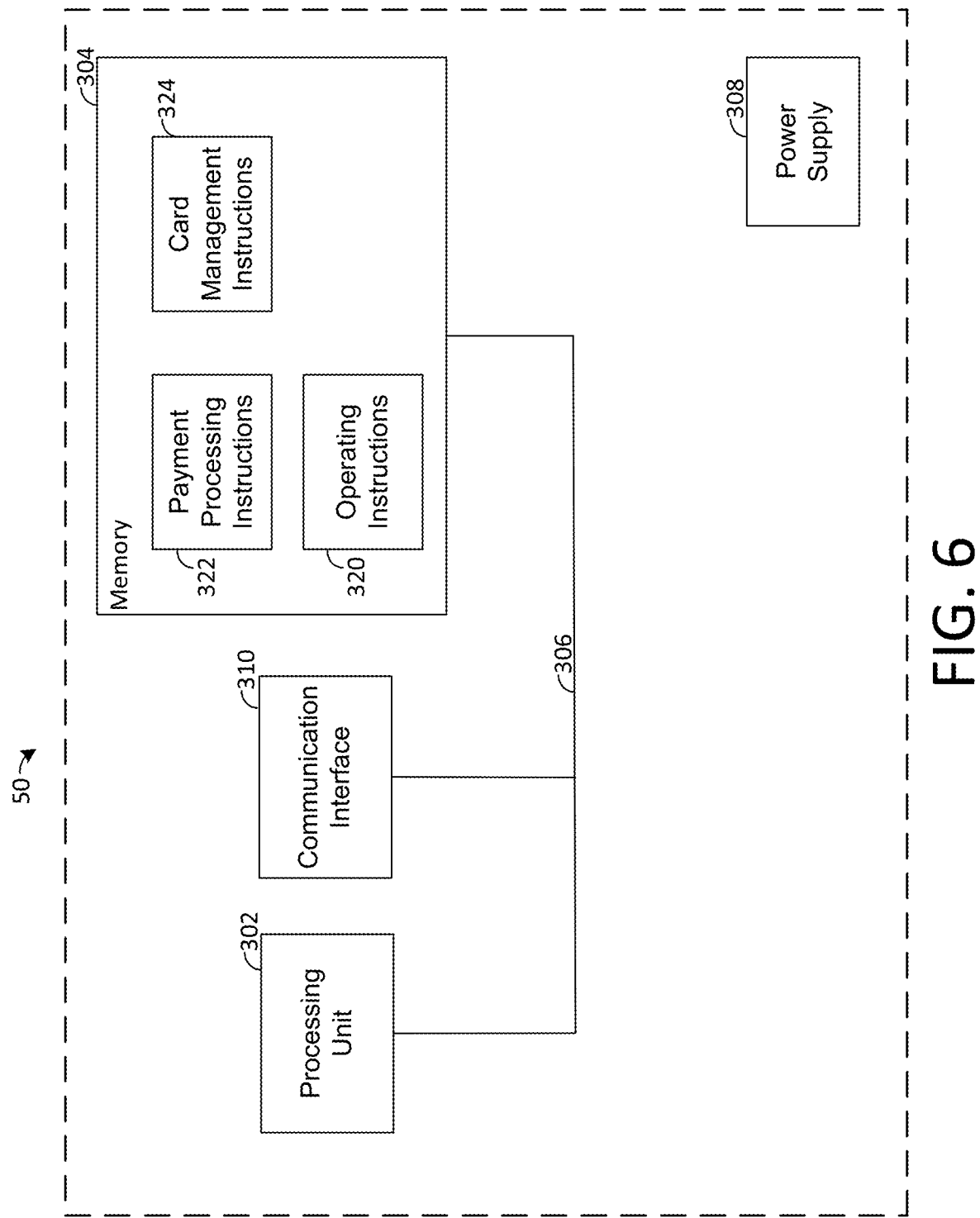
FIG. 6 depicts an illustrative block diagram of a payment service system in accordance with some embodiments of the present disclosure.

FIG. 6 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 6, it will be understood that the payment service system 50 may include additional components, one or more of the components depicted in FIG. 6 may not be included in the payment service system 50, and the components of payment service system 50 may be rearranged in any suitable manner. It also will be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, and a communication interface 310.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, and card management instructions 324.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I$^2$C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 6, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments the communication interface 310 may utilize higher speed communication interfaces such as Wi-Fi, cellular, Ethernet, or fiber optics. The communication interface 310 may establish a secured connection (e.g., via TLS or SSL) with a payment terminal 20 (e.g., merchant device 29) in order to exchange messages relating to processing of transaction information such as background payment information. The communication interface 310 may also communicate with other servers of the payment server 40 such as transaction processing servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Transaction processing servers may be associated with and operated by one or more of the merchant, issuer, or customer banks.

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or transaction processing servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations).

Card management instructions 324 may include instructions for determining rules for processing payment card types at payment readers 22 (e.g., sending the rules to the merchant device 29 via network 30) that are in communication with the payment service system 50. Although the discussion herein includes processing at both payment service system 50 and merchant device 29, it will be understood that some or all aspects of card management instructions 324 may be executed at merchant device 29, and that some aspects of payment management instructions 224 may be executed at payment service system 50.

In some embodiments, card management instructions 324 may include instructions for receiving and providing information from transaction messages, such as transaction and background information for a payment transaction sent from a payment terminal 20. In some embodiments, the card management instructions 324 may include instructions for processing both standard and background payment card types, and for performing processing of the particular information for payment authorization based on a type of payment card or loyalty card.

Card management instructions 324 may include instructions for receiving authorization requests for both standard and background payment card types from a payment terminal 20 (e.g., either or both of payment reader 22 and merchant device 29). In some embodiments, the card management instructions 324 may include instructions for determining a payment card type based on information received from a payment terminal 20. The card management instructions 324 may include instructions for determining how to provide the payment information to an appropriate server (e.g., bank server 60). For example, the card management instructions 324 may include instructions for providing information to authorize payment for both standard and background payment card types to one or more servers (e.g., bank server 60, etc.). Card management instructions 324 may include instructions for performing selection at payment service system 50 of a payment card type for which to provide payment authorization information. The selection may be made based on rules stored in payment service system 50 as card management instructions 324, and may be based on the various information described herein for determining or selecting a payment card type for use in a payment transaction. The card management instructions 324 may include instructions for receiving a response to an authorization request from a server corresponding to each selected payment card type, and may provide such response or responses to payment terminal 20 (e.g., payment reader 22 or merchant terminal 29) via a network.

In some embodiments, card management instructions 324 may include instructions for generating and providing token information associated with payment card (e.g., on a mobile device running a transaction application) after use. In some embodiments, the card management instructions 324 may include instructions for tokenization of payment information associated with a payment card, such as a card number, PAN, or other similar information. In some embodiments, a token may be assigned to a payment card from payment service system 50 may be unique or static, although in some embodiments, tokens may be generated dynamically at either payment service system 50 or payment device 10 (e.g., via a transaction application on the mobile device 10). Note that the tokens generated by card management instructions 324 may be associated with either background protocol-type payment cards and loyalty cards. In some embodiments, payment service system 50 may provide tokens generated based on card management instructions 324 to a transaction application on payment device 10 or to a payment terminal 20 (e.g., payment reader 22) for use in wireless payment transactions. Note that each token may be based on authorization provided via interaction with a transaction application, such as by a user selecting an option to use tokenization for payment transactions (e.g., transactions involving wireless standard and background-type payment card and loyalty cards). A token may be provided to payment terminal 20 as part of information necessary to authorize payment of one or more portions.

In some embodiments, thousands or even millions of payment terminals 20 or similar devices may be in communication with payment service system 50, and may provide information about the payment terminals 20 themselves as well as payment transactions that occur at the payment terminals 20, as well as other information. Based on the information provided, payment service system 50 may update rules stored in card management instructions 324, and may provide updates for payment terminals 20 from time-to-time, such as to improve functionality of the payment terminal, or to facilitate more efficient processing of payment information during payment transactions. More specifically, information stored at payment server 50 may allow card management instructions 324 to update instructions stored in memory at merchant device 29 and payment reader 22 for performing payment card processing tasks and payment authorization in a payment transaction at the payment terminal 20.

In some embodiments, card management instructions 324 may include instructions for generating rules for controlling operations of reader chip 100 of payment reader 22. In some embodiments, payment service system 50 may use information stored in card management instructions 324 to update transaction processing instructions 132, background application instructions 14, and payment management instructions 224. In some embodiments, the rules may provide various procedures and steps for making determinations for processing standard and background payment card types from one or both of the merchant device 29 or reader chip 100, as well as information relating communication of transaction options (e.g., offers, loyalty combinations, etc.) via a background application. Card management instructions 324 may generate rules based on a particular set of criteria and update the rules based on changes to the criteria.

In one embodiment, criteria for rules stored in card management instructions 324 may be updated from time-to-time based on information about payment readers 22 in communication with payment service system 50. The information may include metrics about numerous payment terminals 20 engaging in similar transactions (e.g., based on other terminals of the same merchant, type of merchant, geographical location, time frame, etc.). In some embodiments, rules in card management instructions 324 may be updated to improve and update background processing based on information such as merchant type, similar merchants, similar merchant locations, payment card applications, issuers, payment card type, loyalty programs, or other information.

In some embodiments, criteria for rules stored in card management instructions 324 may be for a particular payment terminal 20, and may be updated based on information about the particular payment terminal 20. In this regard, card management instructions 324 may include metrics about the payment terminal 20, such as merchant information, location, information about customers (e.g., accounts), payment card apps, issuers, payment card type, loyalty programs or other information. In some embodiments, rules stored in card management instructions 324 may be updated to improve and update background processing with information about offers, incentives, promotions, discounts, coupons, or other similar information.

In some embodiments, card management instructions 324 may include instructions for performing analytics with regard to information stored at payment service system 50 to generate updated instructions for a plurality of payment terminals 20. While limited examples of analytics performed by instructions stored at payment service system 50 will be discussed herein, it will be understood that, in some embodiments, analytics may be performed by instructions stored at payment service system 50 of any suitable information for generating, updating, providing, or creating instructions for payment system 1 and its individual components for achieving the functionality described herein. In addition, analytics performed at payment service system 50 may be performed by any instructions or combination of instructions stored in memory, and while examples may be provided of performance of analytics by specific instructions, it will be understood that similar analytics of any information described herein may be performed by any instructions or combination of instructions stored in memory at the payment system 1.

As an example of the foregoing discussion regarding analytics, in some embodiments, the analytics performed may include application of techniques such as machine learning to data stored at the payment service system 50. For example, card management instructions 324 may determine that instructions related to background processing may be update by analyzing a set of training data regarding background communications and processing results (e.g., responses to offers, transactions in which a processing error occurred, transactions in which a customer declined to use a background account, etc.). Card management instructions 324 also may access additional information, such as transaction frequency, transaction authorization rates, customer authorization information, loyalty program accounts, merchant information, or other suitable information. Card management instructions 324 may apply algorithms such as machine learning algorithms to the information and generate updated rules included in instructions stored at the payment terminal 20 where the particular payment reader 22 is located. Card management instructions 324 may provide the updated rules to the payment terminal 20 for storage in memory as an update to relevant instructions, such as transaction processing instructions 132 or payment management instructions 224.

Figure 7:
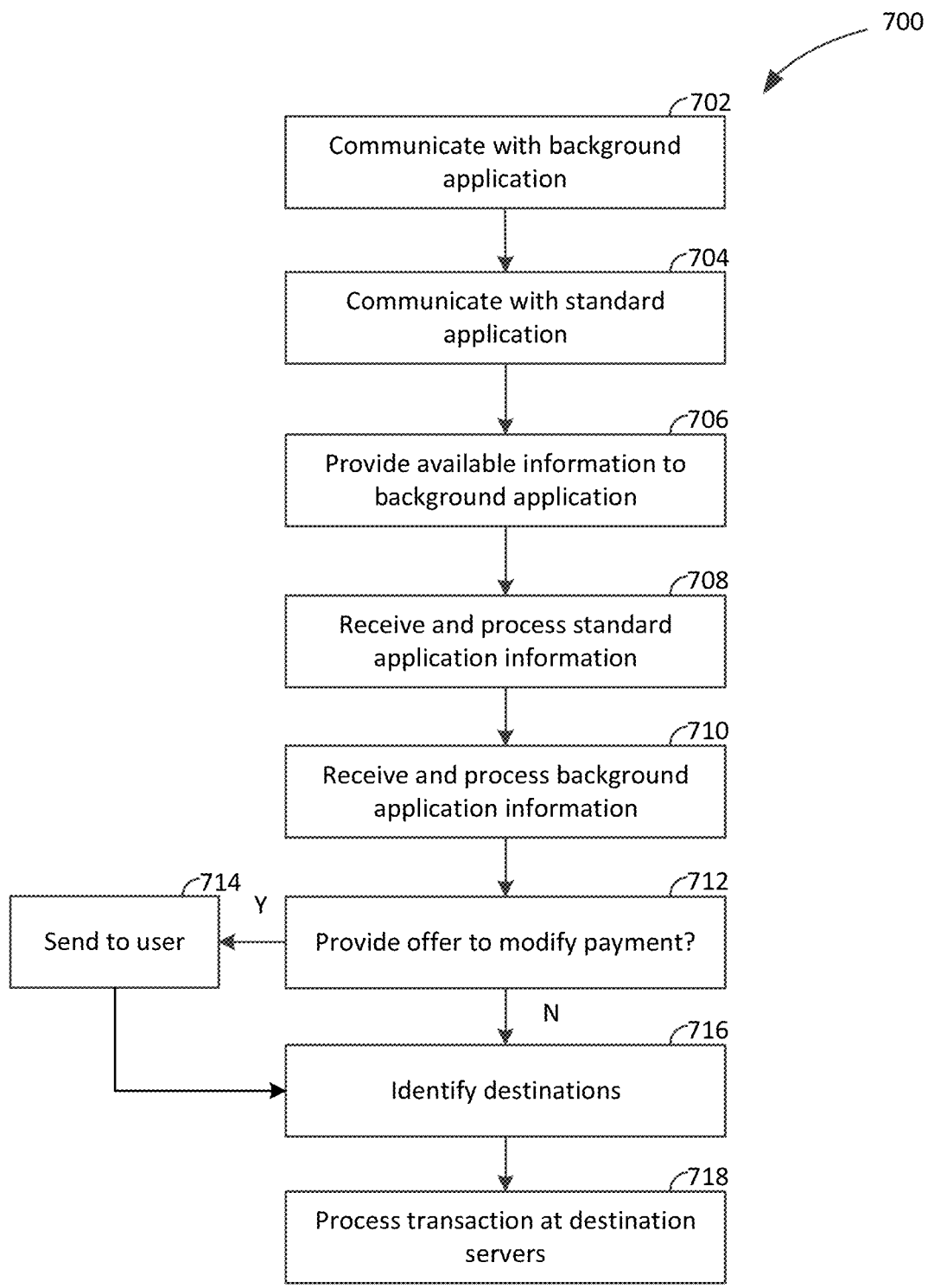
FIG. 7 depicts a non-limiting flow diagram illustrating exemplary methods for processing a payment transaction with a payment device executing background operations in accordance with some embodiments of the present disclosure.
Figure 8:
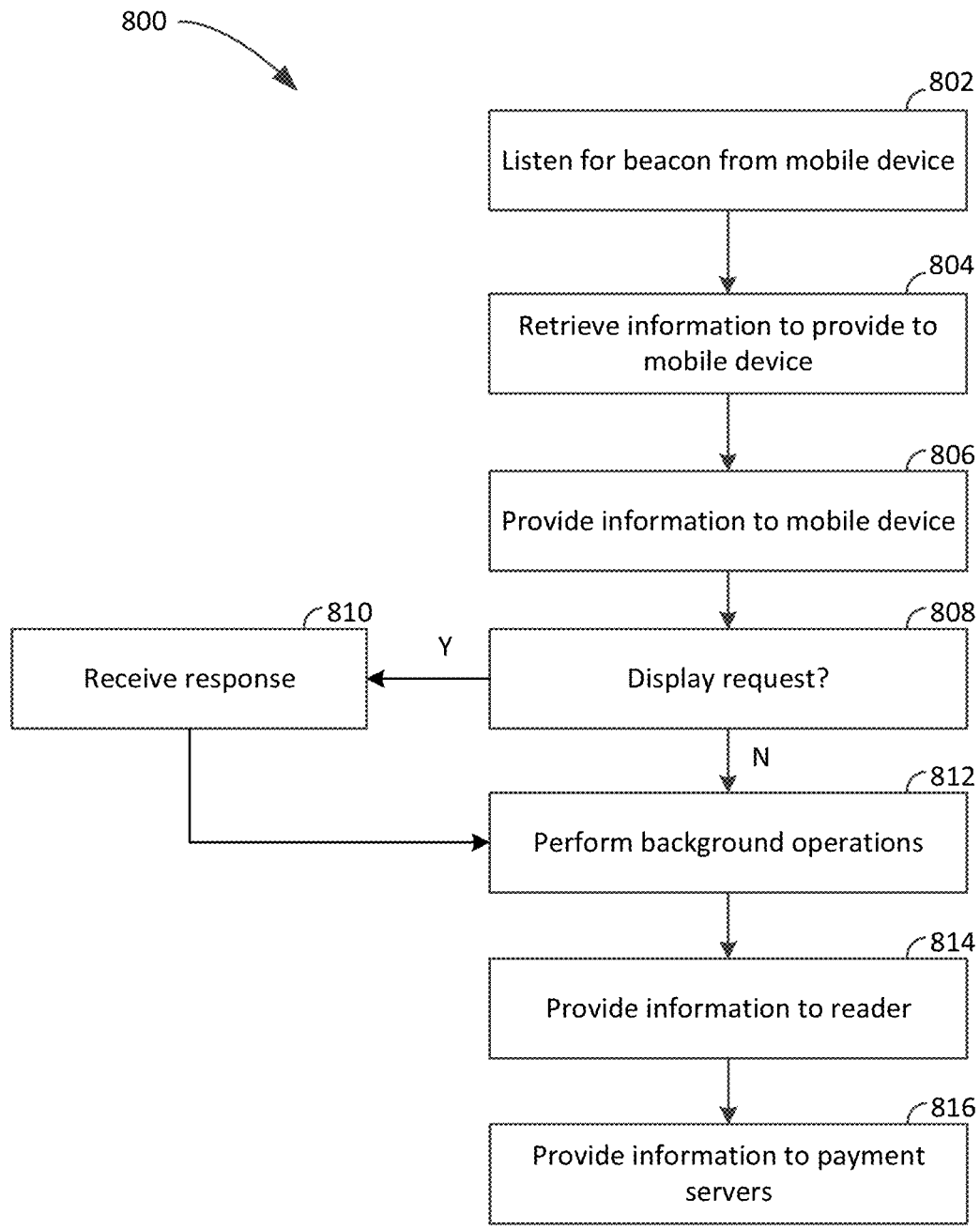
FIG. 8 depicts a non-limiting flow diagram illustrating exemplary methods for providing a notification to a background application in accordance with some embodiments of the present disclosure.

In view of the structures and devices described supra, methods that can be implemented in accordance with the disclosed subject matter will be better appreciated with reference to the flowcharts of FIGS. 7-8. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 7 depicts a non-limiting flow diagram illustrating exemplary methods for processing a payment transaction with a payment device executing background instructions in accordance with the present disclosure.

At step 702, a payment reader 22 may communicate with a transaction application running in the background on a mobile device 10. The background application may provide a message to the payment reader 22, such as an indication of a user, a device, accounts, or other suitable identifiers. In some embodiments, payment reader 22 may provide a message in response, and may include various information, such as a request to communicate payment information (e.g., with a transaction application running in either the foreground or background). The payment reader 22 also may provide information indicating that the payment reader 22 is compatible for processing a payment transaction with the background application. The background transaction application may provide a response message to the payment reader 22 indicating that the mobile device 10 is a device enabled to perform communication via background applications. In an embodiment, the message communicated at step 702 may be provided via wireless communication (e.g., NFC, Bluetooth, Wi-Fi, cellular) from the mobile device 10 to the payment reader 22. After the payment reader 22 communicates with the background application, processing may proceed to step 704.

At step 704 the payment reader 22 may communicate with a standard transaction application running on the mobile device 10. The payment reader 22 may communicate with the mobile device 10 by exchanging messages, such as wireless messages communicated via NFC. The message may include a request to the standard transaction application to communicate payment information wirelessly via NFC, as well as other payment transaction information. In some embodiments, after a standard transaction application receives a request to begin a transaction from a payment reader 22, the transaction application may provide (e.g., display) a listing of standard payment card types to the user may, such as via a GUI of the mobile device 10. In some embodiments, the user may select a payment card via the standard transaction application for use with the particular payment transaction based on the listing displayed by the mobile device 10. After the payment reader has communicated with a standard transaction application, processing may proceed to step 706.

At step 706 the payment reader 22 may provide available information to background application, such as user-specific promotions or offers, payment transaction information, merchant information, loyalty information, other available offers, incentives, or other information as described herein. In some embodiments, the payment reader 22 may provide the information based on communication with various sources, such as payment service system 50, merchant device 29, or other devices in communication with the payment reader 22. After the payment reader 22 has provided available information to the background application, processing may proceed to step 708.

At step 708, the payment reader 22 may receive transaction information from the standard transaction application on the mobile device 10 and process the information. The standard transaction application may generate a message that may include payment transaction information (e.g., a payment card type associated with the transaction application selected by the user, user account information, a payment card number or token, etc.). The transaction application may provide the payment information associated with the selected payment card to the payment reader 22, which may process the information, such as by determining a destination for directing a request for information for authorizing payment of portions of the payment transaction. After the payment reader 22 has received payment information from the mobile device 10, processing may proceed to step 710.

At step 710 the payment reader 22 may receive background information from the background application on the mobile device 10, such as user account information, such as merchant, payment, or item-specific loyalty information, user selections, and other suitable information as described herein. The background information may be provided based on user selections (e.g., pre-selected user preferences), information received by the background application from other sources (e.g., a remote server via a wireless network, etc.), and other suitable sources as described herein. After background information has been received at the payment reader 22, processing may proceed to step 712.

At step 712 The payment reader 22 may determine whether to suggest to the user to modify information for the particular transaction (e.g., payment information) based on the background information. A modification to payment provided by payment reader 22 may comprise an offer to the user (e.g., promotion, discount, loyalty incentive, etc.), or may include a prompt for allowing a user to provide payment using another payment card type. In some embodiments, the payment reader 22 may determine whether to provide the offer to modify payment based on various information available to the background application. If the payment reader 22 determines that an offer to modify payment should be provided to the user, the payment reader 22 may provide the offer to modify payment to the user (e.g., mobile device 10) at step 714. The user may accept or decline the offer, and processing may continue to step 716. If an offer to modify payment should not be made, processing may continue to step 716

At step 716 payment reader 22 may determine a destination for information received from each of the standard application and background application. The destinations may include one or more payment servers, such as one or more payment service systems or bank servers 60 of a payment server 40. Payment reader 22 may provide each respective type of information to an appropriate destination, such as payment servers operated by a payment card issuer or loyalty program administrator, according to various types of information. The information may include information such as account information, destination identifiers included in messages exchanged with the applications running on mobile device 10, instructions stored in memory, rules received via communication with other devices (e.g., merchant device 29 or payment service system 50), and other information as described herein. After the payment reader 22 identifies a destination for each of the types of information received from the standard and background applications, the information may be provided to the respective destinations, and processing may continue to step 718.

At step 718, one or more destination servers (e.g., payment server 40, bank server 60, etc.) may use combined information from both the standard transaction application and background transaction application to process the payment transaction. The destination servers may process the payment transaction according to various rules. In some embodiments, such rules may provide information for selecting a procedure for processing a payment transaction, such as processing a transaction, such as altering payment information to be processed based on the rules (e.g., switching payment card type from standard to background based on execution of the rules). In addition, the rules may specify that the decision of whether to alter the payment information should be provided to the user, such as via message to the mobile device 10. After the servers process the respective transaction information, processing may end.

FIG. 8 depicts a non-limiting flow diagram illustrating exemplary methods for providing a message as part of a wireless payment transaction in accordance with some embodiments of the present disclosure. In the embodiment describe with respect to FIG. 8, a beacon will be provided from payment device such as a mobile device 10, however, it will be understood that the beacon could be provided from other devices (e.g., payment reader, merchant device, other local devices, etc.), and that processing may be modified accordingly.

At step 802, payment reader 22 may listen for a beacon from a mobile device 10, such as a wireless message that conforms to a beacon or other format (e.g., advertising messages, etc.) that identifies the device or user or provides other suitable information. A beacon may be transmitted wirelessly, and may include various information provided to a mobile device 10, such from a remote server or based on instructions in a mobile application running on the mobile device 10. When the payment reader 22 receives a beacon from a mobile device 10, processing may proceed to step 804.

At step 804, the payment reader 22 may retrieve information to provide to the mobile device 10, such as an offer to select a different payment card type (e.g., from standard to background) for use with the particular payment transaction. A message including the information may be generated at the payment reader 22, and may include various information or offers, such as an offer to switch transaction applications (e.g., from standard transaction application to an application operating in the background), various incentives, loyalty information, and merchant information. The information may be received from various sources, such as from a remote server (e.g., payment server 40), a merchant device 29 (e.g., based on inputs, instructions or rules stored on the merchant device 29), or based on instructions stored in memory on the payment reader 22. After the payment reader 22 has received information to provide to the mobile device 10, processing may proceed to step 806.

At step 806, payment reader 22 may provide its own beacon message (e.g., a response message) to a mobile device 10. The beacon message may include information such as a location identifier of the payment reader 22, merchant information, offer information, or other information as described herein. A transaction application (e.g., a background application) installed on the mobile device 10 may be configured to listen for such beacons and process information included in the beacon message. In an exemplary embodiment of an offer being provided to a user, the payment reader 22 may provide the offer or information to the mobile device 10. In some embodiments, the information may be provided to the mobile device 10 via various suitable communication techniques, such as via wireless communication techniques (e.g., Bluetooth, Wi-Fi, cellular network, etc.). In some embodiments, payment reader 22 may provide the information to another device (e.g., merchant device 29, payment server 40, etc.) for communication to the mobile device 10 (e.g., a transaction application running on the mobile device 10). Payment reader 22 may provide the information to the mobile device 10 via other techniques in other embodiments. After payment reader 22 has provided the information to the mobile device, processing may proceed to step 808.

At step 808, the mobile device 10 may process the offer or information, and provide the offer or information to the user. In some embodiments, information may include information for processing by a standard application running on the mobile device 10, which may display the information to the user via the mobile device 10. The information also may include information for processing that should be provided to an application running in the background, which may receive and process the information transparently to the user. Whether the information (e.g., request) should be displayed may be determined based on various information, such as pre-defined user preferences, account information, or instructions stored in memory at the mobile device 10 (e.g., a transaction application or background application). If the information should be displayed (e.g., by the standard transaction application), the transaction application may display the information (e.g., request) to the user and receive a response. Processing may then proceed to step 810. If the information should not be displayed, but instead handled by an application running in the background, processing may proceed to step 812.

At step 810, the mobile device 10 may receive one or more responses from the user, such as a response accepting or declining an offer provided from the payment reader 22. In some embodiments, a response may be provided indicative of a user input (e.g., selection) at each of a standard transaction application and a transaction application running in the background of the mobile device 10. A response from either application may indicate a user's opting to accept or decline an offer to perform various operations, including switch transaction applications for the payment transaction (e.g., to use a different payment card or payment card type), to accept a promotion, to associate loyalty account information, and perform other operations as described herein. After responses from the user have been received, processing may proceed to step 812.

At step 812, the mobile device may determine whether additional information related to a payment transaction should be exchanged with a transaction application running in the background on the mobile device 10, e.g., based on the response received at step 810 or other background information. The background application may exchange information regarding a user's preferences, such as authorization or election to use a particular payment card type, loyalty card, or other account for use with future payment transactions (e.g., default payment card type, loyalty account association, etc.). In addition, the background transaction application may perform various operations in the background as part of processing the information received from payment reader 22. The background operations may include gathering and associating various information with the payment transaction, as described herein. In some embodiments, information such as user information (e.g., payment and loyalty account information), payment card information, merchant information, transaction application information, merchandise or item information, and other information may be collected and generated for processing. In some embodiments, at least some of the information may be provided to a remote server (e.g., payment server 40) transparently to the user. In some embodiments, information may be determined based on instructions included in the background application, responses from a remote server, or other information as described herein, and may be provided for display to the user (e.g., via a notification or other message readable by the user of the mobile device 10) or may be provided via a communication with the payment reader 22 in the background (e.g., via NFC), transparently to the user. After any background information has been determined at the mobile device, processing may continue to step 814.

At step 814, information relating to the transaction (e.g., based on background processing) may be provided from the mobile device 10 to the payment reader 22. Once the payment reader has received the information, processing may continue to step 816, where the payment reader 22 may receive and begin processing information received from the background application.

At step 816, payment reader 22 may provide payment information for authorization received from one or more transaction applications (e.g., standard transaction application or background application) and wait for execution of one or more portions of the payment transaction. In some embodiments, the payment information may include either or both standard or background-type payment information, and may be provided as an authorization request to one or more servers. In some embodiments, the payment reader 22 may identify a server as a destination for the authorization information request based on various information, such as information received from the user via a standard transaction application or via a background application. In addition, authorization responses may be requested and received for one or more portions of the payment transaction. A payment reader 22 may wait to receive an authorization response for such a portion from a server, and process the portion of the payment transaction based on the response. When the payment reader has processed all portions of the payment transaction, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for a payment reader to process a single payment transaction informed by communications between the payment reader and a payment device, the method comprising:
    monitoring, by the payment reader, for devices capable of exchanging information via a communication protocol that does not comply with a standard payment protocol;
    receiving, at the payment reader, a request to process a payment transaction;
    establishing, by the payment reader, between a near field communication (NFC) interface of the payment reader and an NFC interface of the payment device, first wireless communications with the payment device via the communication protocol that does not comply with a standard payment protocol;
    providing, by the payment reader via the first wireless communications, one or more request messages to the payment device;
    acquiring, by a first application of the payment device, identifying information for a first account based on the one or more request messages;
    receiving, with the NFC interface of the payment reader from the first application of the payment device via the first wireless communications, one or more information messages including the identifying information for the first account, wherein communication of the one or more information messages by the payment device is transparent to a user of the payment device;
    establishing, by the payment reader, between the NFC interface of the payment reader and the NFC interface of the payment device, second wireless communications with the payment device via the standard payment protocol;
    receiving, with the NFC interface of the payment reader from a second application of the payment device via the second wireless communications, one or more payment information messages including identifying information for a second payment account, wherein the first application runs in a background of the payment device to communicate the one or more information messages to the NFC interface of the payment reader while the second application is running in a foreground of the payment device;
    providing, by the payment reader to a payment service system, in connection with the payment transaction, both the identifying information for the second payment account and the identifying information for the first account; and
    receiving, at the payment reader from the payment service system, approval of the payment transaction based on both the second payment account and the first account.

2. The method of claim 1, wherein the standard payment protocol comprises a Europay/Mastercard/Visa (EMV) standard.

3. The method of claim 1, wherein the one or more request messages comprises a request to notify a user that the first account may be used for the payment transaction.

4. The method of claim 1, wherein the payment reader provides the one or more request messages to the payment device prior to establishing the second wireless communications with the payment device via the standard payment protocol.

5. A method for a first device to process a single transaction informed by communications between the first device and a second device, the method comprising:
    monitoring, by the first device, for devices capable of exchanging information via a communication protocol that does not comply with a standard payment protocol;
    receiving, at the first device, a request to process a transaction;
    establishing, by the first device, between a near field communication (NFC) interface of the first device and an NFC interface of the second device via the communication protocol that does not comply with a standard payment protocol, first wireless communications with the second device;
    receiving, with the NFC interface of the first device from a first application of the second device via the first wireless communications, one or more information messages including identifying information for a first account, wherein communication of the one or more information messages by the second device is transparent to a user of the second device;
    establishing, by the first device, between the NFC interface of the first device and the NFC interface of the second device via the standard payment protocol, second wireless communications with the second device;
    receiving, with the NFC interface of the first device from a second application of the second device via the second wireless communications, one or more transaction information messages including identifying information for a second transaction account, wherein the first application runs in a background of the second device to communicate the one or more information messages while the second application is running in a foreground of the second device;
    providing, from the first device to a server, in connection with the transaction, both the identifying information for the second transaction account and the identifying information for the first account; and
    receiving, at the first device from the server, approval of the transaction based on both the second transaction account and the first account.

6. The method of claim 5, wherein establishing first wireless communications with the second device comprises:
    providing a beacon message via the NFC interface of the first device; and
    receiving a response to the beacon message via the NFC interface of the first device.

7. The method of claim 6, wherein the beacon message is provided by the second device.

8. The method of claim 7, further comprising providing, by the first device via the first wireless communications, one or more beacon response messages to the second device,
    wherein the second device acquires the identifying information for the first account based on the one or more beacon response messages.

9. The method of claim 6, wherein the beacon message is provided to the second device, and
wherein the second device acquires the identifying information for the first account based on the beacon message.

10. The method of claim 5, wherein the second device and the first device establish the first wireless communications prior to establishing communications via the standard payment protocol.

11. The method of claim 5, wherein the standard payment protocol comprises a Europay/Mastercard/Visa (EMV) standard.

12. The method of claim 5, wherein the second device determines that the first account may be used for the transaction based on establishing the first wireless communications.

13. The method of claim 5, further comprising transmitting, based on the monitoring, a message from the first device to the second device, thereby indicating to the second device that the first device is compatible with the communication protocol that does not comply with the standard payment protocol, wherein the communication of the one or more information messages by the second device to the NFC interface of the first device is automatically performed in response to the message transmitted from the first device.

14. A device for processing a single transaction informed by communications between the device and a second device, the device comprising:
a first communication interface;
a second communication interface;
a memory having instructions stored thereon;
a processing unit coupled to the first communication interface, the second communication interface, and the memory, wherein the processing unit is configured to execute the instructions to:
monitor for devices capable of exchanging information via a communication protocol that does not comply with a standard payment protocol;
receive a request to process a transaction;
establish, between the first communication interface of the device and a first communication interface of the second device, first wireless communications with the second device via the communication protocol that does not comply with a standard payment protocol;
receive, from a first application of the second device via the first wireless communications, one or more information messages including identifying information for a first account, wherein communication of the one or more information messages by the second device is transparent to a user of the second device;
establish, between the second communication interface of the device and a second communication interface of the second device, second wireless communications with the second device via the standard payment protocol;
receive, from a second application of the second device via the second wireless communications, one or more transaction information messages including identifying information for a second transaction account, wherein the first application runs in a background of the second device to communicate the one or more information messages while the second application is running on the second device;
provide, to a server, in connection with the transaction, both the identifying information for the second transaction account and the identifying information for the first account; and
receive, from the server, approval of the transaction based on both the second transaction account and the first account.

15. The device of claim 14, wherein establishing the first wireless communications with the second device comprises:
provide a beacon message via the first communication interface of the device; and
respond to the beacon message via the first communication interface of the device.

16. The device of claim 15, wherein the beacon message is provided by the second device.

17. The device of claim 16, wherein the processing unit further executes the instructions to provide, via the first wireless communications, one or more beacon response messages to the second device, and
wherein the second device acquires the identifying information for the first account based on the one or more beacon response messages.

18. The device of claim 15, wherein the beacon message is provided to the second device, and
wherein the second device acquires identifying information for the first account based on the beacon message.

19. The device of claim 14, wherein the standard payment protocol comprises a near field communication (NFC) protocol.

20. The device of claim 19, wherein first wireless communications with the second device are established prior to establishing communications via the near field communication (NFC) protocol.

21. The device of claim 14, wherein the standard payment protocol comprises a Europay/Mastercard/Visa (EMV) standard.

22. The device of claim 14, wherein the second device determines that the first account may be used for the transaction based on establishing the first wireless communications.

23. A non-transitory computer-readable storage medium of a first device comprising instructions stored therein that, when executed by one or more processors, cause the one or more processors to perform operations comprising:
monitoring for devices capable of exchanging information via a communication protocol that does not comply with a standard payment protocol;
receiving a request to process a transaction;
establishing, between a near field communication (NFC) interface of the first device and an NFC interface of a second device, first wireless communications with the second device via a communication protocol that does not comply with a standard payment protocol;
establishing, between the NFC interface of the first device and the NFC interface of the second device, second wireless communications with the second device via the standard payment protocol;
receiving, from the a first application of the second device via the first wireless communications, one or more information messages including identifying information for a first account, wherein communication of the one or more information messages by the second device is transparent to a user of the second device;
receiving, from a second application of the second device via the second wireless communications, one or more transaction information messages including identifying information for a second transaction account, wherein the first application runs in a background of the second device to communicate the one or more information messages while the second application is running in a foreground of the second device;

providing, to a server, in connection with the transaction, both the identifying information for the second transaction account and the identifying information for the first account; and receiving, from the server, approval of the transaction based on both the second transaction account and the first account.

24. The non-transitory computer-readable storage medium of claim 23, wherein establishing first wireless communications with the second device comprises:

providing a beacon message via the NFC interface of the first device; and responding to the beacon message via the NFC interface of the first device.

25. The non-transitory computer-readable storage medium of claim 24, wherein receiving beacon messages via the first wireless communications comprises:

receiving, from the second device, the beacon message.

26. The non-transitory computer-readable storage medium of claim 25, wherein the instructions further cause the one or more processors to perform operations comprising:

providing, via the first wireless communications, one or more beacon response messages to the second device, wherein the second device acquires the identifying information for the first account based on the one or more beacon response messages.

27. The non-transitory computer-readable storage medium of claim 24, wherein receiving beacon messages via the first wireless communications comprises:

receiving, from the second device, the beacon message; and acquiring identifying information for the first account based on the beacon message.

28. The non-transitory computer-readable storage medium of claim 23, wherein establishing first wireless communications with the second device comprises:

establishing, between the second device and the first device, first wireless communications prior to establishing second wireless communications via the standard payment protocol.

29. The non-transitory computer-readable storage medium of claim 23, wherein the standard payment protocol comprises a Europay/Mastercard/Visa (EMV) standard.

* * * * *